United States Patent
Hakamada

[11] Patent Number: 5,558,227
[45] Date of Patent: Sep. 24, 1996

[54] SEALED CONTAINER HAVING A CALENDAR FUNCTION

[76] Inventor: Ikuhiro Hakamada, Yushima 3-29-3-502 Bunkyo-ku, Tokyo Prefecture, Japan

[21] Appl. No.: 524,102

[22] Filed: Aug. 21, 1995

Related U.S. Application Data

[63] Continuation of Ser. No. 117,115, filed as PCT/JP92/00756, Jun. 15, 1992, abandoned.

[51] Int. Cl.⁶ .................................................. B65D 85/72
[52] U.S. Cl. ...................... 206/459.5; 206/242; 426/112
[58] Field of Search .................................. 206/242, 63.5, 206/459.1, 459.5, 534; 235/380; 426/112

[56] References Cited

U.S. PATENT DOCUMENTS 5,272,320  12/1993  Hakamada  .............................. 235/380

FOREIGN PATENT DOCUMENTS

| | | |
|---|---|---|
| 56-175342 | 12/1981 | Japan . |
| 58-78287 | 5/1983 | Japan . |
| 59-136441 | 9/1984 | Japan . |
| 60-77294 | 5/1985 | Japan . |
| 61-38054 | 3/1986 | Japan . |
| 62-105137 | 7/1987 | Japan . |
| 1-137834 | 9/1987 | Japan . |
| 1-96840 | 6/1989 | Japan . |

*Primary Examiner*—Jimmy G. Foster
*Attorney, Agent, or Firm*—Howson & Howson

[57] ABSTRACT

A sealed container has inscribed on it a continuous portion of a calendar, which overlaps the time interval between the date of production of the contents and the expiration date thereof. This contributes to better quality control for the contents. The container can be selected by an automatic vending machine by which the consumer can select a container having the desired inscribed information.

10 Claims, 32 Drawing Sheets

*Fig. 4*

| ORANGE JUICE | | | | | | | SOLELY FOR BIRTHDAY | 3/30 1940–1942 |

'90    2

| M | T | W | T | F | S | S |
|---|---|---|---|---|---|---|
| ... | ... | ... | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | ... | ... | ... | ... |

FOR 1940

FOR 1941

FOR 1942

PRODUCED 2/5/90

SOLELY FOR
THE ARIES

'90  8

| M | T | W | T | F | S | S |
|---|---|---|---|---|---|---|
| ... | ... | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 | ... | ... |

PRODUCED 8/2/90

ORANGE JUICE

ON 8'TH, BE CAREFUL
IN CONTACT WITH
THE TAURUS

ON 18'TH, BE CAREFUL
IN CONTACT WITH
YOUR FRIENDS

```
                    SOLELY FOR THE
                  FIRST WHITE MERCURY

'90     11
                                    |
    M   T   W   T   F   S   S       | ON 2'ND, BE CAREFUL
   ...  ... ...  1   2   3   4      | IN THE DIRECTION
                                    | OF NORTH
    5   6   7   8   9  10  11       |
   12  13  14  15  16  17  18       | ON 16'TH, BE CAREFUL
                                    | IN CONTACT WITH
   19  20  21  22  23  24  25       | YOUR FRIENDS
   26  27  28  29  30  ... ...      |
                                    |
                                    | ON 30'TH, THE DIRECTION
       PRODUCED 11/3/90              | OF WEST IS A LUCKY ONE
                                    |
          ORANGE JUICE               |
```

SEALED CONTAINER HAVING A CALENDAR FUNCTION

This is a continuation of prior application Ser. No. 08/117,115, filed as PCT/JP92/00756 on Jun. 15, 1992, abandoned.

TECHNICAL FIELD

The present invention relates to sealed containers, for example juice cans made of steel or aluminum, sold in an automatic vending machine.

BACKGROUND ART

Recently canned juice has been marketed in large quantities in automatic vending machines. The container is a sealed metal container made of steel or aluminum. Designs with elaborate and novel ideas, intended to attract the interest and attention of consumers for promoting sales, are printed together with the name of the merchandise, a trademark, an identification of raw material, and the date of production, etc. on a surface of the container. The date of production is printed on the container to guarantee the quality of the content juice.

DISCLOSURE OF THE INVENTION

The contents are taken out from the container for consumption or use through an outlet formed in the container. When the contents are exhausted, the empty container is ordinarily thrown away. A juice can made of aluminum or steel has an outlet closure in the form of a pull-tab provided at one end of the juice can. The closure is pulled out, thus forming an outlet. After that, the juice is consumed through the outlet. Then, the empty container is ordinarily thrown away at once, which generates an environmental problem.

The showy design, etc. marked on the surface of the container for sales promotion is of little use in daily life and the container merely functions as a sealed container.

This invention is intended to solve the above problem and to provide a sealed container which is directly useful for daily life, by providing the container with a calendar function, and at the same time to provide a permanent use for the container. Thus, the container serves to keep a clean environment.

To achieve the above object, a container in accordance with the invention has a continuous part of a calendar inscribed on its outer surface.

The term "continuous part of a calendar" as used here means a calendar containing not only a date of production, or other date but also a further part of a calendar. An inscription with only one day cannot perform an essential function of a calendar, which is to make a schedule. For providing a calendar function, an inscription of at least one week or one month will be necessary ordinarily. The term "inscribed" refers to printing directly on the container and also to a printing which has an integrity with the container such as a sticker placed on the container. Printing directly on the container has advantages in handling, surface gloss and better integrity with the container.

A second feature of the invention is to provide a sealed container having a calendar function for a specific date or a specific period of time characterized in that a continuous part of a calendar and information corresponding to said continuous part of the calendar determined from a specific date or a specific period of time is inscribed on a surface of the container.

A third feature of the invention is to provide a sealed container which is for one time use, in which the contents are of a nature such that there is a time limit for using the contents determined solely by the date of production. At least a part of a calendar which overlaps the period running from the date of production to the expiration date, i.e. the time limit for using the contents, is inscribed on a surface of the container.

The "time limit for using the contents determined solely by the date of production" means that a time limit is determined by counting from a date of production, due to the nature of the contents of the containers. For example, in the case of an aluminum juice can, the time limit for use is ordinarily about one year from the date of production. In the case of a cigarette pack a period during which the cigarette can be smoked is ordinarily about one year from the date of production. In the case of the paper milk carton, the time limit is ordinarily about one to two weeks from the production date due to the perishable nature of milk.

The term "one time use" means "not used again in a same manner." For example, in the case of an ordinary juice can made of aluminum, after a pull-tab is removed and the contents are consumed, the pull-tab can not be attached back to the same juice can again to form a sealed juice can. In the case of a cigarette pack, after the pack is opened and the cigarettes are consumed, an identical, sealed cigarette pack can not be made by inserting new cigarettes into the same pack. Thus, "one time use" means "expendable" and, "not capable of being reused in the same manner."

That is, the present invention does not contemplate a container which can be reused by replacing the contents as in the case of an ordinary container with a cover (for example a lunch box). The present invention relates solely to an expendable container for one-time use.

The "part of a calendar which overlaps the period running from the date of production to the expiration date" means, in the case of a date of production of 15th of Feb., 1991 and expiration date of 18th of Dec., 1991, any of the following:

A calendar covering 5 months from March, 1991 to July, 1991 (not including either the date of production or the expiration date);

A calendar covering one year from January, 1991 to December, 1991 (including both the date of production and the expiration date);

A calendar covering a half year from January, 1991 to June, 1991 (including the date of production but not the expiration date); and A calendar covering a half year from July, 1991 to December, 1991 (including the expiration date, but not the date of production).

A fourth feature of the invention is an automatic vending machine for the above-mentioned container with a calendar function, in which at least two kinds of sealed containers having a calendar function are housed. The continuous part of calendar or the information determined for a specific date or a specific period of time, is different for the different kinds of containers. A calendar type designating means or means for designating a specific date or a specific period of time is provided.

BRIEF DESCRIPTION OF DRAWINGS

FIG. 4 is a perspective view showing two juice cans stacked one on top of another;

In FIGS. 2, 5, 7, 20, 25, 26, 27, 28, 29 and 30, calender months are represented by boxes.

BEST MODE FOR CARRYING OUT THE INVENTION

Figure 1:
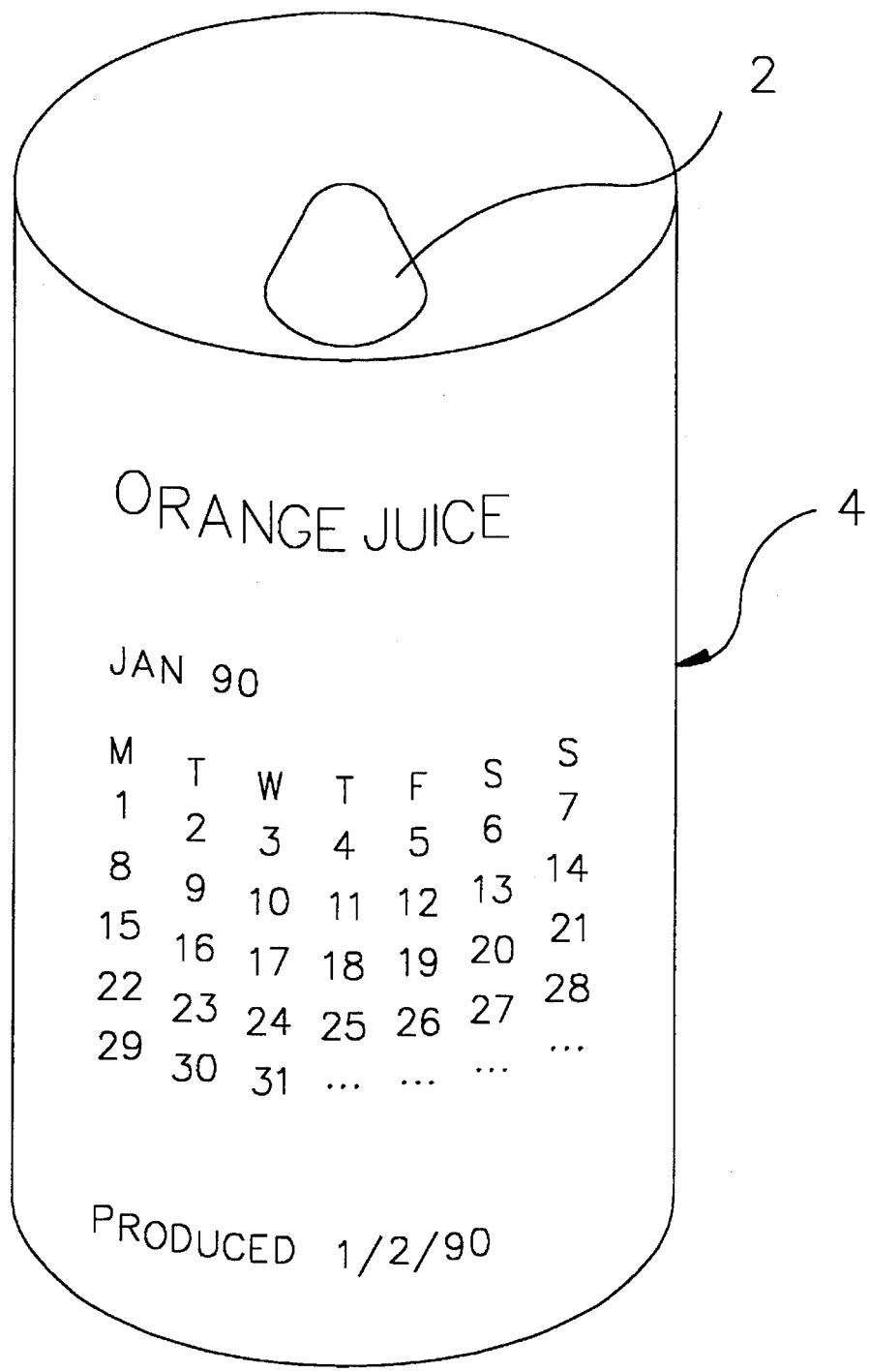
FIG. 1 is a perspective view of a juice can having a calendar function, illustrating a first embodiment of the invention.

FIG. 1 shows a sealed juice can 2 representing a first example of a container having a calendar function according to the invention. A calendar covering one month is inscribed on a surface of the juice can. When a calendar for one month is inscribed on a surface of a juice can, the juice can will serve as a calendar if it is placed at a conspicuous location before the juice is consumed. When the juice is to be drunk, an outlet closure 4 (a pull-tab), provided at one end of the juice can, is pulled out to form an outlet. The juice can then be drunk, either continuously or intermittently, through the outlet. The juice can serves as a calendar when the juice is being drunk. The juice can also performs its normal function to supply the juice. Then after the juice is finished, the juice can becomes very light in weight. The empty, light weight, juice container can be used again as a calendar and is convenient to carry around. Since the empty juice container can be effectively used as a calendar after the juice is consumed it is less likely to be thrown away. Thus, the invention contributes to the purpose of keeping the environment clean. Also, since a juice can is usually made of metal such as aluminum or steel, if a calendar is printed thereon along with a name of merchandise, it can be used for a prolonged period of time, performing its function as a calendar in view of its durability, gloss and smoothness of surface, and attractive looks.

Figure 2:
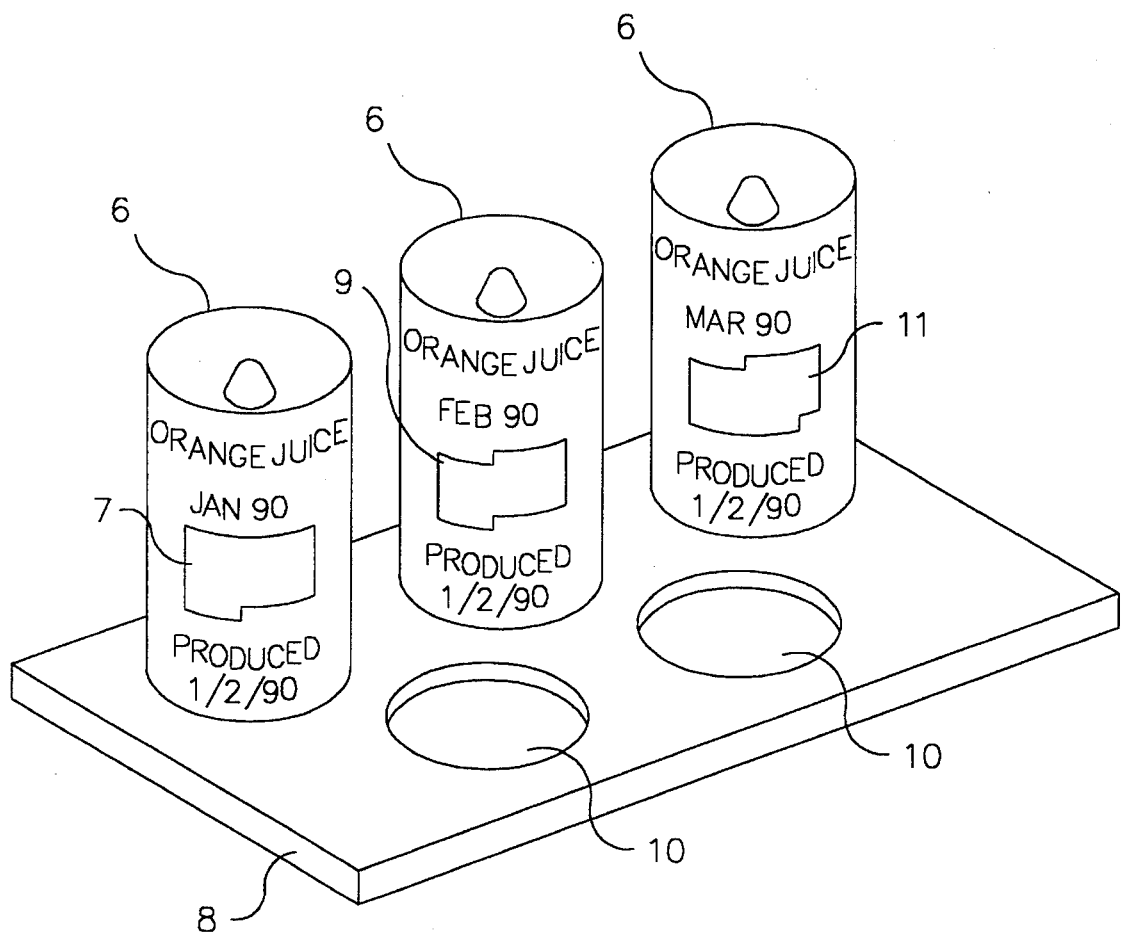
FIG. 2 is a perspective view showing a plurality of juice cans together with a supporting stand.

FIG. 2. illustrates plurality of juice cans 6 having a calendar function inserted into a stand, 8 thus forming a multiple-month calendar, the months being represented by boxes 7, 9 and 11. Here, the diameter of the holes 10 and 12 provided in the stand is of about the same as the diameter of the juice can, so that each hole can hold a juice can rotatably.

Figure 3:
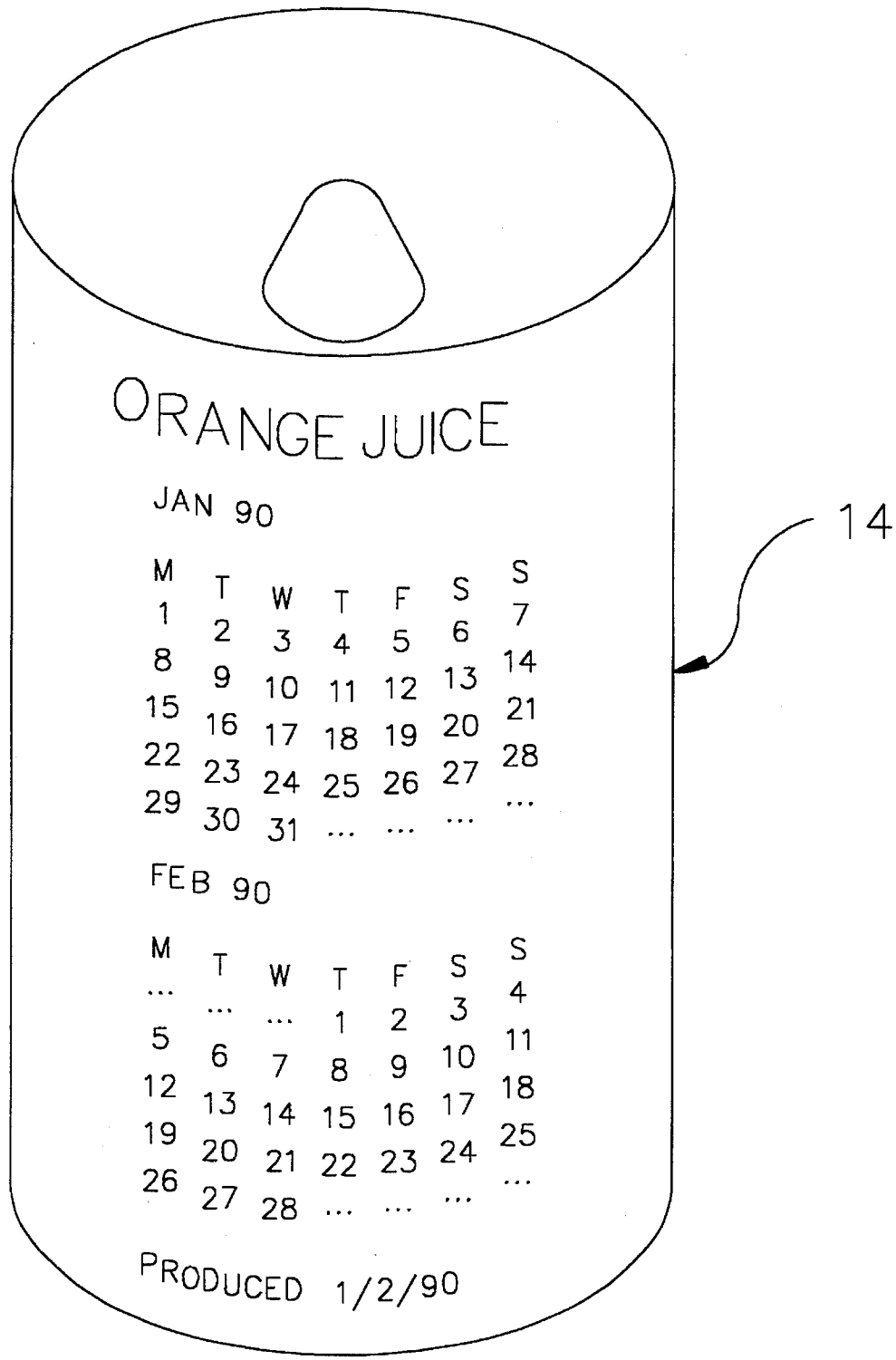
FIG. 3 is a perspective view of a juice can having a calendar function, illustrating another embodiment of the invention.

FIG. 3 shows a juice can 14 having a two-month calendar inscribed on its surface.

Figure 4:
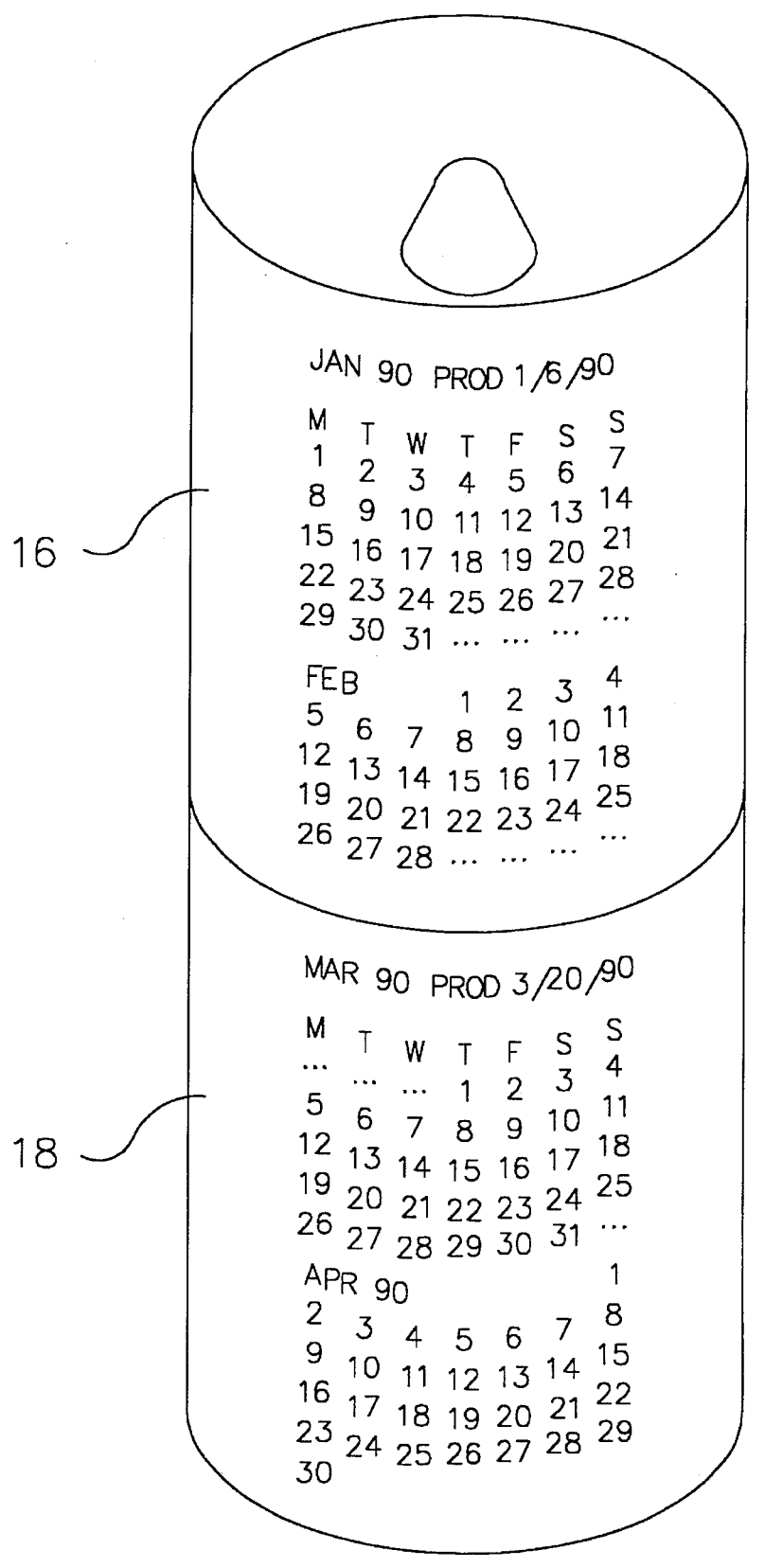

FIG. 4 shows an example in which two of these juice cans 16 and 18 are stacked, one on top of the other to provide a portable four month calendar.

Figure 5:
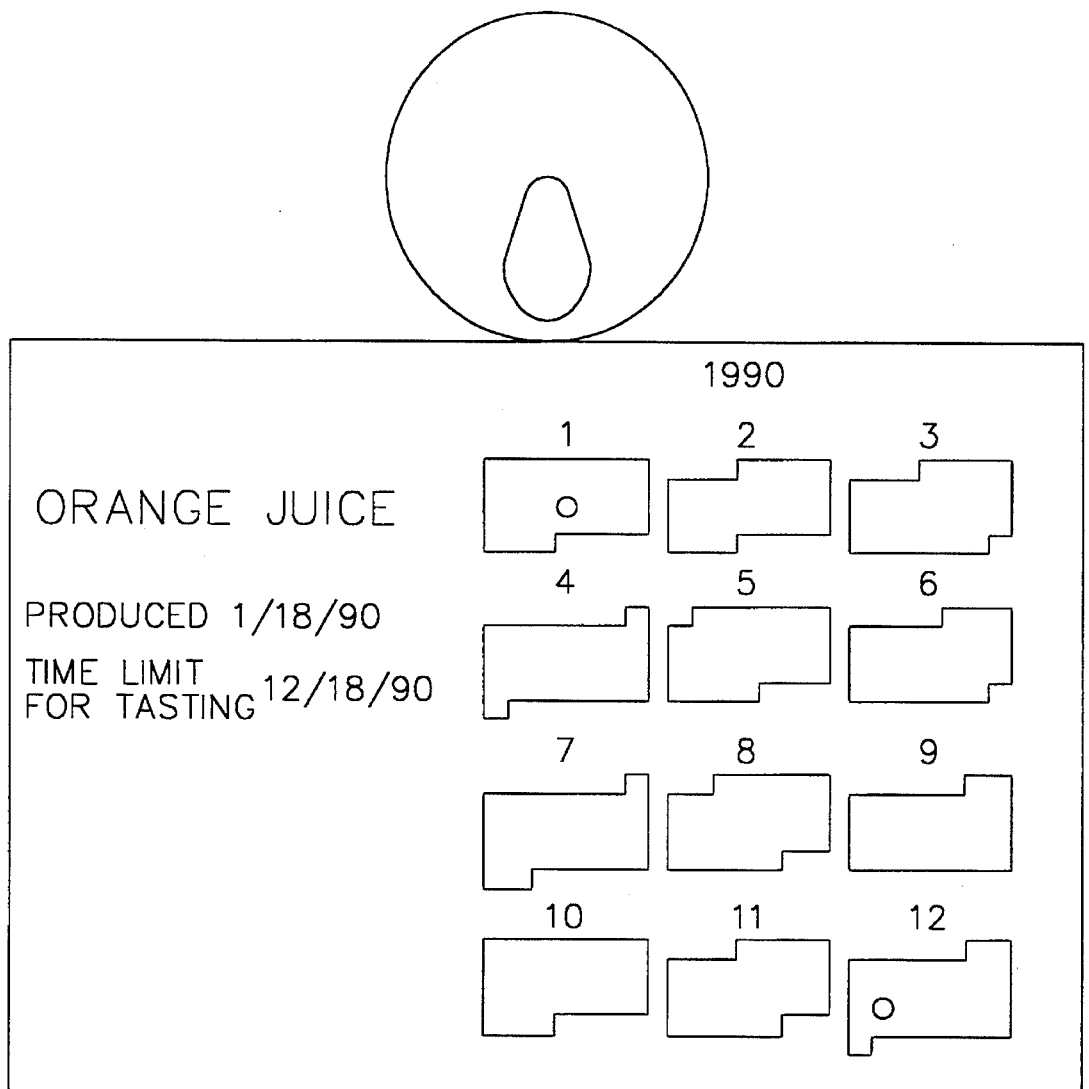
FIG. 5 is a development of a juice can in accordance with still another embodiment of the invention.

FIG. 5 is a development of a juice can having a one year calendar inscribed on its surface. While this example utilizes a calendar covering one year, a calendar covering more than one year can be inscribed on a single can.

Figure 6:
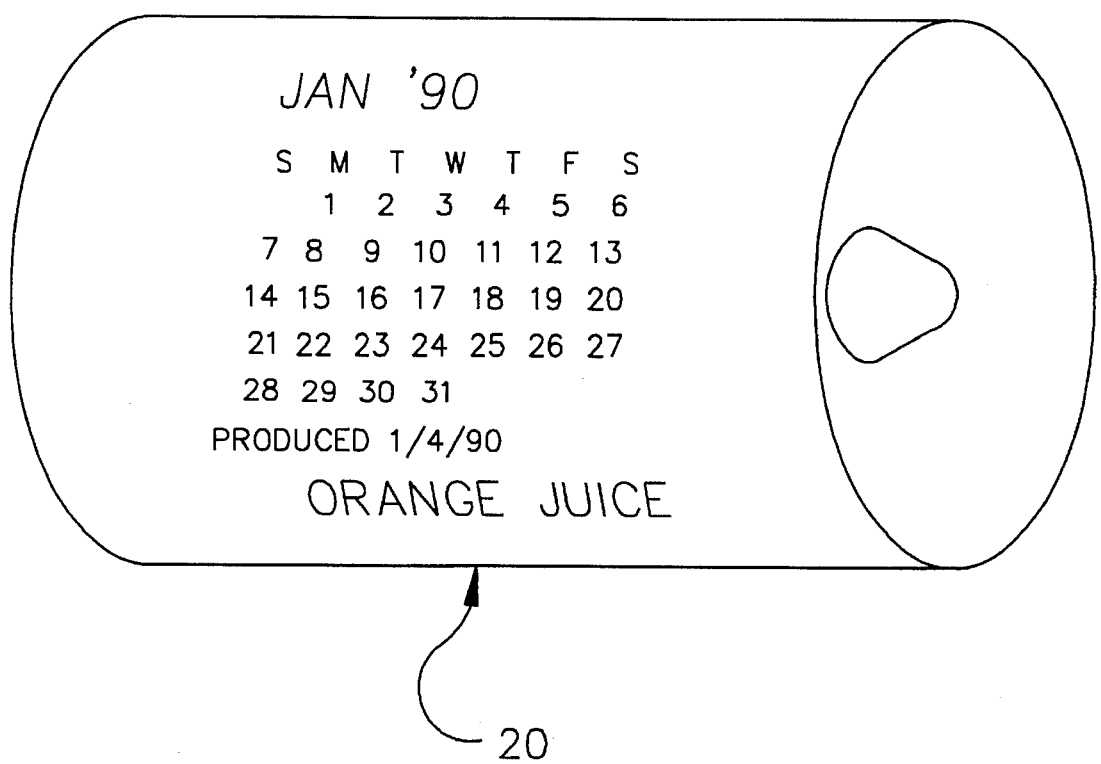
FIG. 6 is a perspective view of a juice can in accordance with still another embodiment.

FIG. 6 shows a juice can 20 having a one-month calendar printed thereon in a lateral direction so that it can be read with the can placed on its side. When the calendar is printed in the lateral direction, a large space in the lateral direction can be made available, which makes the calendar remarkably easier to read.

Figure 7:
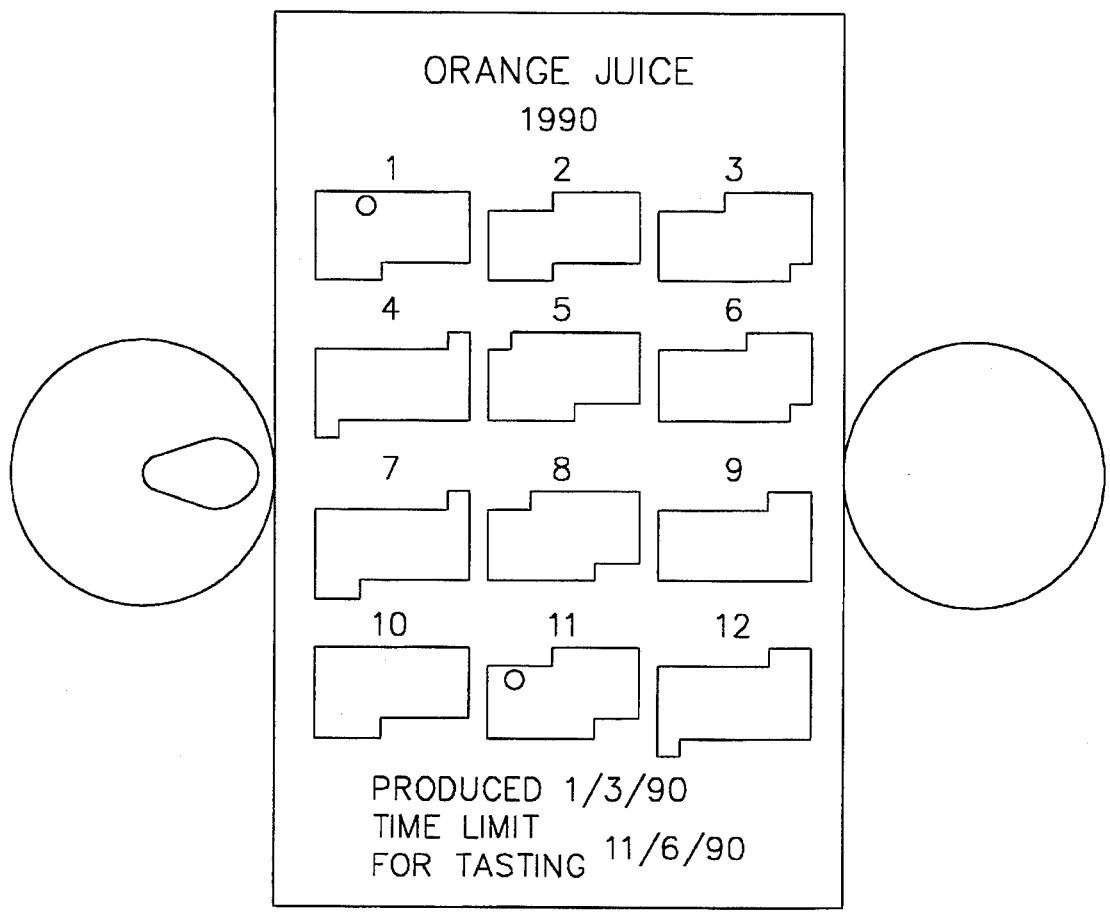
FIG. 7 is a development of a juice can in accordance with still another embodiment of the invention.

FIG. 7 is a development of a juice can having a one year calendar printed in a lateral direction so that it can be read with the can lying on its side. The juice container can be used in combination with stands which can rotatably hold one or more of the cans, as exemplified by stand 22 in FIG. 8, stand 24 in FIG. 9, and stand 26 in FIG. 10. It will be also possible to replace the juice cans from time to time, thus forming new calendars.

Figure 11:
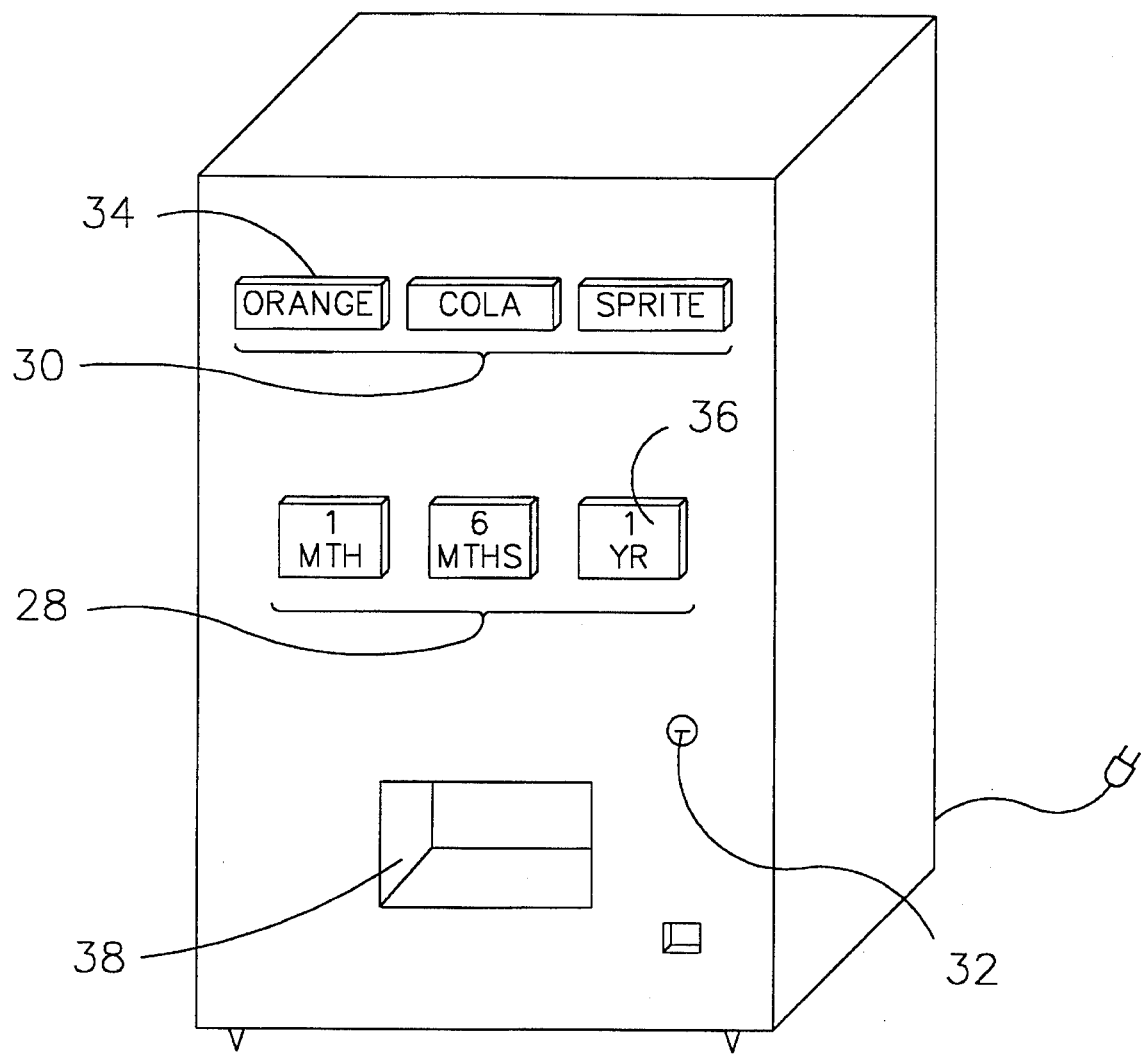
FIG. 11 is a perspective view of a vending machine for delivering a sealed container having a calendar function in accordance with the invention.

FIG. 11 shows an automatic vending machine for sealed containers having a calendar function. This automatic vending machine has a calendar type designating means 28 provided in addition to an ordinary content designating means 30. For example, when an orange juice is wanted, and at the same time a juice can with a calendar for one year printed thereon is wanted, first a coin or coins will be inserted into a coin slot 32. Next, a content designating button 34 for example the "orange juice" button 36 is pushed. Then, a calendar designating button, for example the one year button is pushed. Then, a juice can, containing the designated type of juice and having the designated type of calendar printed thereon, will come out through an outlet 38 of the automatic vending machine.

While three content designating buttons are provided in this example, if a vending machine is intended to dispense containers with only one kind of content, the vending machine can have calendar type designating means but no content designating means.

Figure 12:
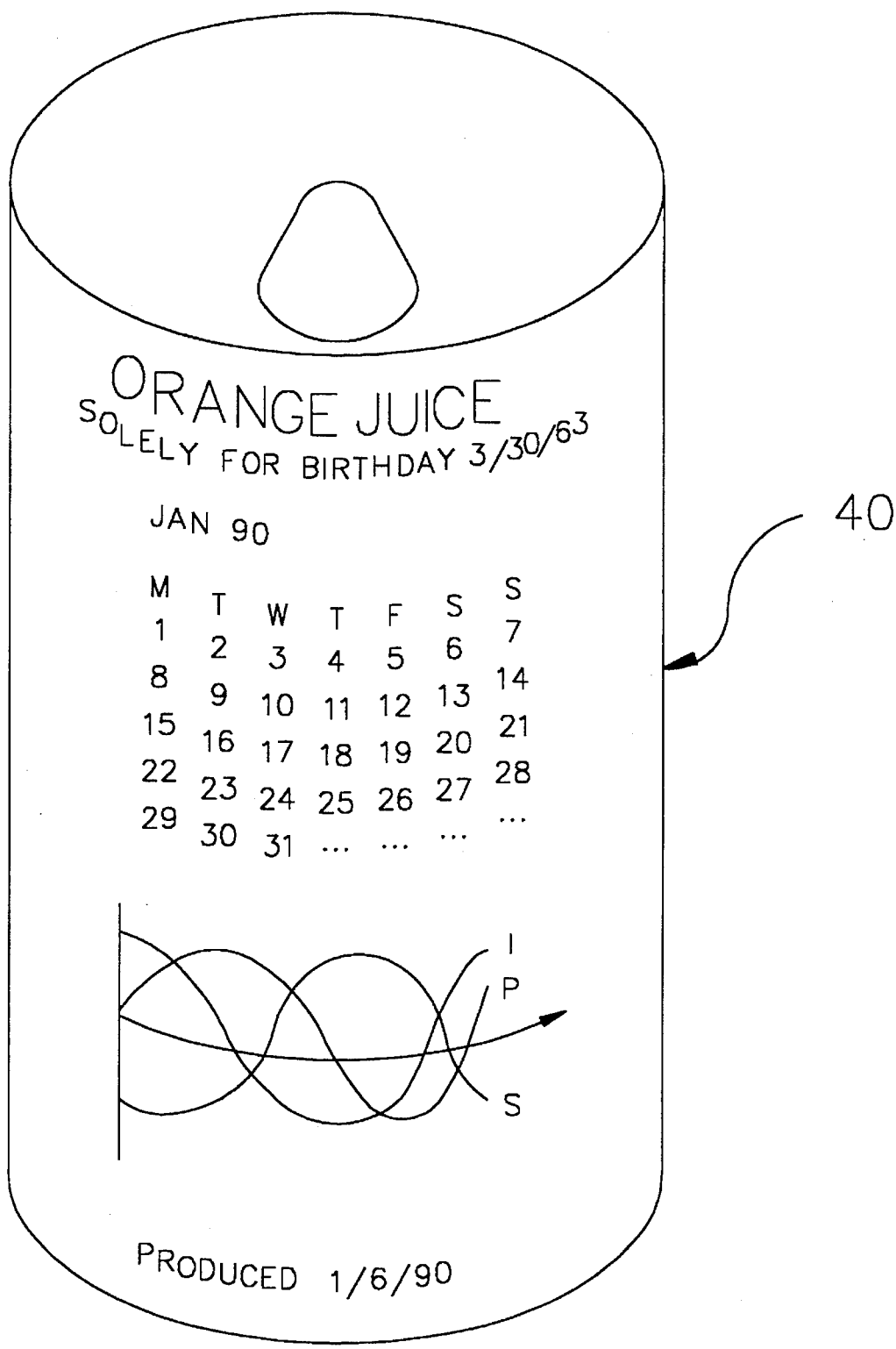
FIG. 12 is a perspective view of a juice can in accordance with still another embodiment.

FIG. 12 shows a juice can 40 having biorhythm information determined for a specific date inscribed on a surface of the can in addition to an ordinary calendar.

Biorhythm information is information determined from one's birthday and has cycles of 23 days, 28 days and 33 days respectively corresponding to physical (P), sensitive (S) and intellectual (I) rhythms. One's daily life can be planned on the basis of such biorhythm information.

An individual can obtain his/her own biorhythm information for a given calendar period from a juice can which is specifically printed with biorhythm information for his/her birthday. Such a juice can will have an added usefulness for his/her daily life.

Figure 13:
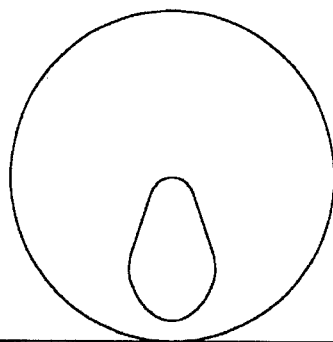
FIG. 13 is a development of a juice can in accordance with still another embodiment.
Figure 13:
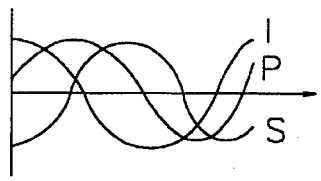
Figure 13:
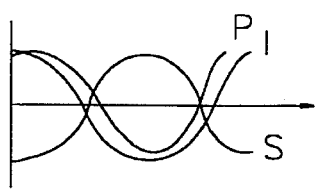
Figure 13:
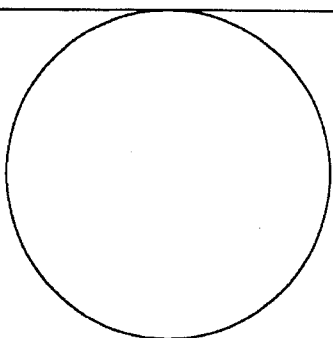

FIG. 13 shows a juice can having inscribed thereon biorhythm information for a specific date in each of a plurality of years. Each person can obtain his/her own biorhythm information by obtaining a juice can on which his/her birthday is designated as the specific date solely for his/her use and by selecting, from the several printed biorhythms the biorhythm information corresponding to his/her own year of birth. Information directly useful for daily life can be obtained, and the juice can will not be immediately thrown away as an empty can. Thus the provision of printed biorhythms thus helps to keep the environment clean.

Figure 14:
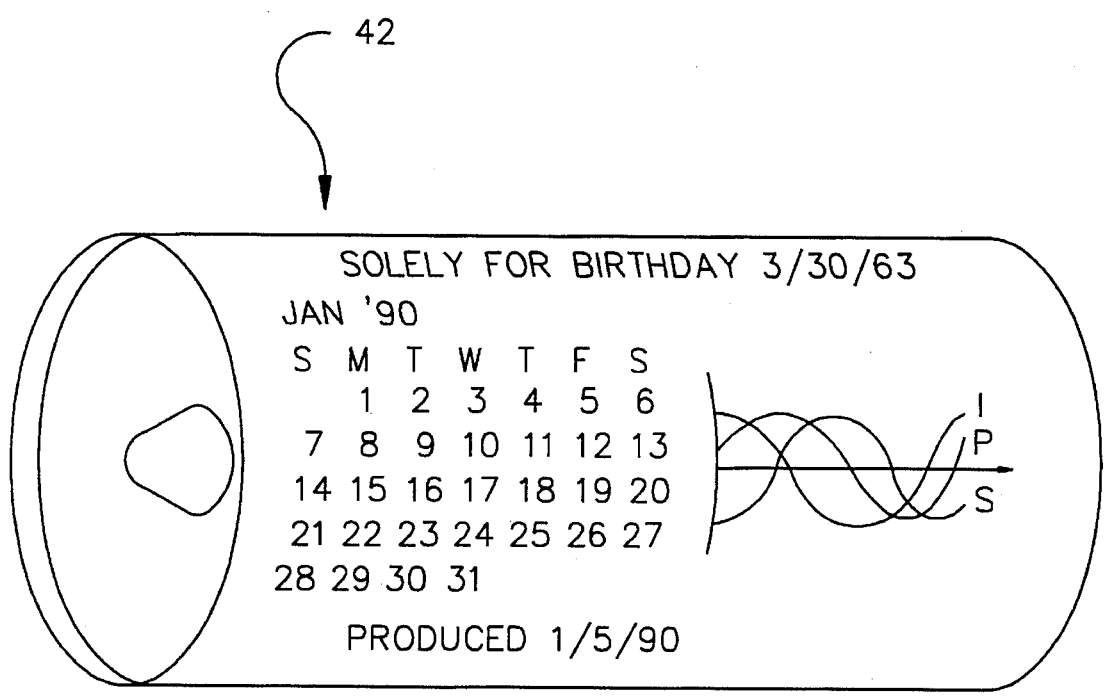
FIG. 14 is a perspective view of a juice can in accordance with still another embodiment.

FIG. 14 shows a sealed juice can 42 on which a calendar and a biorhythm table are printed in a lateral direction so that they can be read with the juice can placed on its side. As in FIGS. 7, 8 and 9, various kinds of calendars intended for specific uses can be printed on the cans.

Figure 15:
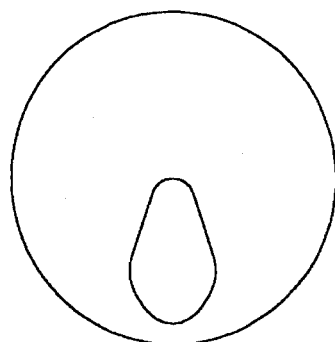
FIGS. 15 and 16 are developments of juice cans in accordance with further embodiments.
Figure 15:
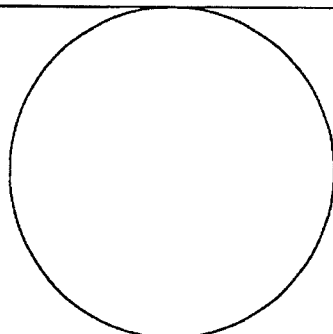

FIG. 15 shows a juice can having a calendar function solely for a specific constellation in the horoscope.

A person's horoscope is based on a constellation determined by his or her birthday. One year is divided into 12 constellations. For example, the constellation for a person born in the interval from Mar. 21 to Apr. 20 is Aries, and the constellation for a person born in the interval from Apr. 21 to May 20 is Taurus and so on. Horoscope information is important information wanted by many individuals. Thus a juice can having a calendar function solely for a specific constellation in the horoscope can supply horoscopic information for an individual even after the juice has been consumed. Therefore, it will not be thrown away immediately and the result will be a cleaner environment.

Figure 16:
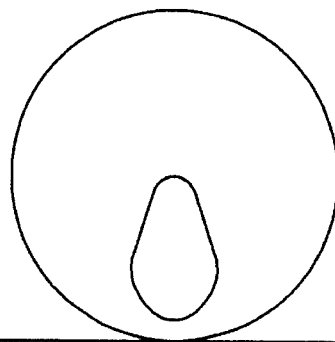
Figure 16:
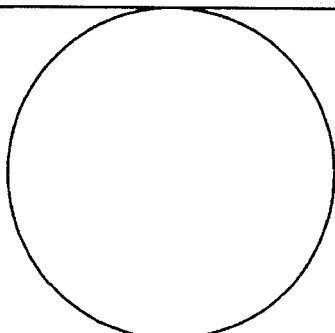

FIG. 16 shows a juice can having a calendar function solely for a specific star in the Tetrastyle Destiny.

A person's Tetrastyle Destiny is based on a star which is determined by a birthday of each person. There is a total of nine stars. For example, the star for a person born in March, 1963 is the First White Mercury, the star for a person born in June, 1964 is the Ninth Purple Mars, and the star for a person born in April, 1969 is the Fourth Green Jupiter and so on. Many persons wish to have information concerning their Tetrastyle Destiny. Thus, if a juice can has a calendar function arranged solely for a specific star in the Tetrastyle Destiny, the juice can may be used even to determine an individual's Tetrastyle Destiny information after the juice contained therein is consumed. Again, the juice can would not be thrown away immediately, and the result will be a cleaner environment.

While the examples of FIGS. 12–15 show a juice can having a calendar function intended solely for a specific date or a specific period of time, all of them provide a calendar information for one month only. However, as an alternative, a calendar for two months or longer can be provide.

Also, while the above are juice cans, the cans may contain other liquids such as beer. It should be noted, however, that as juice cans and beer cans are usually made of metal such as aluminum or steel, they can be kept semipermanently, thus the effect of the problem dealing with empty cans will be quite significant. The can may also contain canned foods such as oranges or peaches, etc. Since such cans are opened by removing an entire end, they can be used also as containers for small articles in addition to their use as a calendar information source.

The container may be a paper package of the type used for containing milk. A straw is inserted into the package after a paper outlet closure is removed. Since milk is perishable in a short period of time, if a calendar for one to two months, including the date of production, is printed on the paper package a user can have a clear idea on the number of days involved. Although a paper package cannot be preserved as well as a metal can, the paper package may be used, after consumption of its contents, to provide calendar information. The package may also be a glass bottle for milk and the like.

Figure 17:
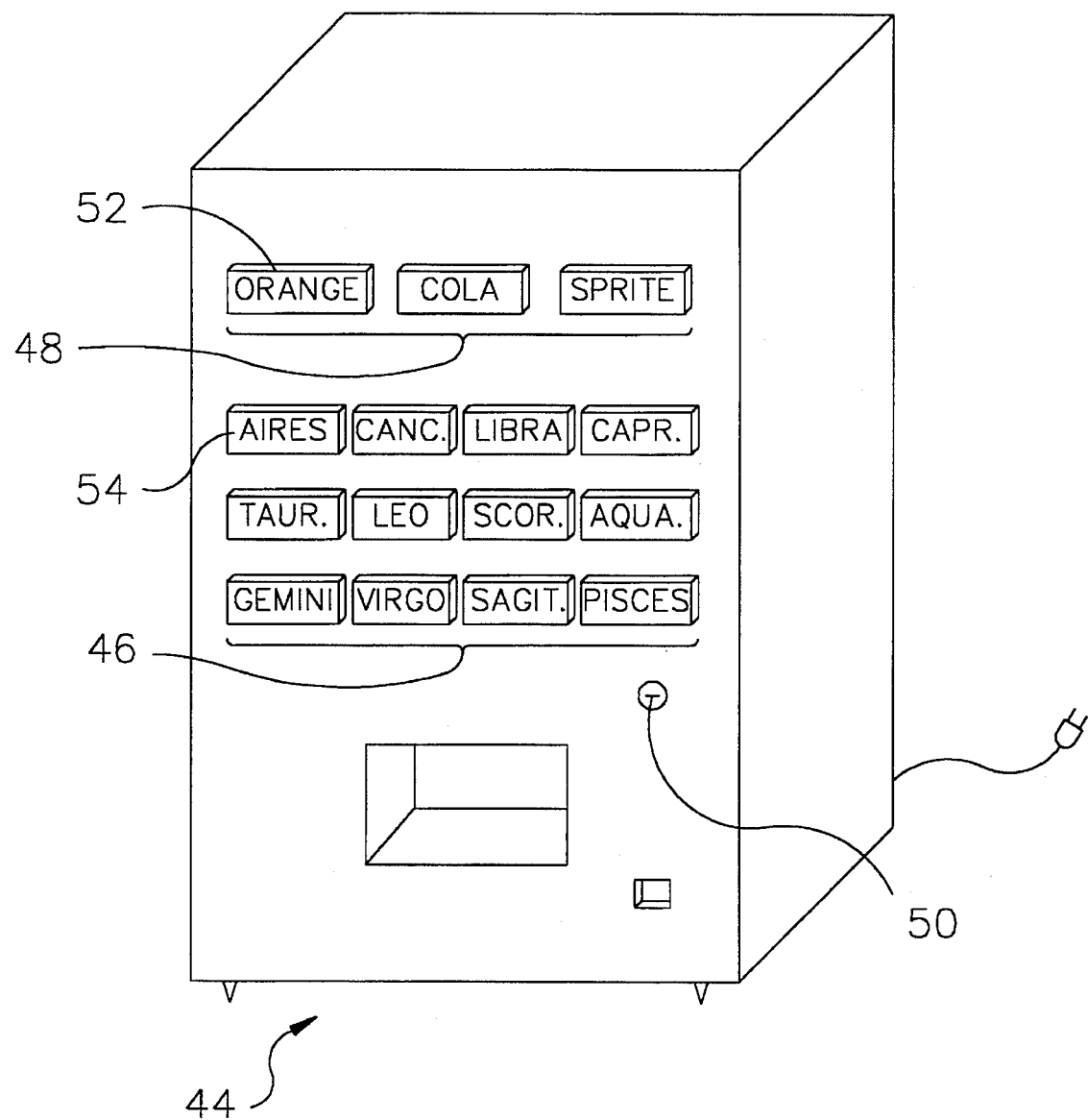
FIG. 17 is a perspective view of still another vending machine for delivering a sealed container having a calendar function in accordance with the invention.

FIG. 17 shows an automatic vending machine 44 for a juice can having a calendar functioning for a specific date or a specific period of time. Specifically the vending machine is designed to dispense juice cans solely for constellations in the horoscope.

This automatic vending machine has constellation designating means 46 in addition to content designating means 48. Content selecting means and constellation selecting means respectively corresponding to the designating means 48 and 46, are provided inside the machine.

A person whose sign is Aries wanting to drink an orange juice, inserts a coin or coins into a coin slot so. Next, an orange designating button 52 is pushed. After that an Aries designating button 54 is pushed. Then, an orange juice can having Aries information printed thereon will be dispensed. This automatic vending machine does not have a calendar designating means because the calendar is a predetermined one month calendar. If the calendar type is not predetermined, a calendar type designating means may also be provided.

Figure 18:
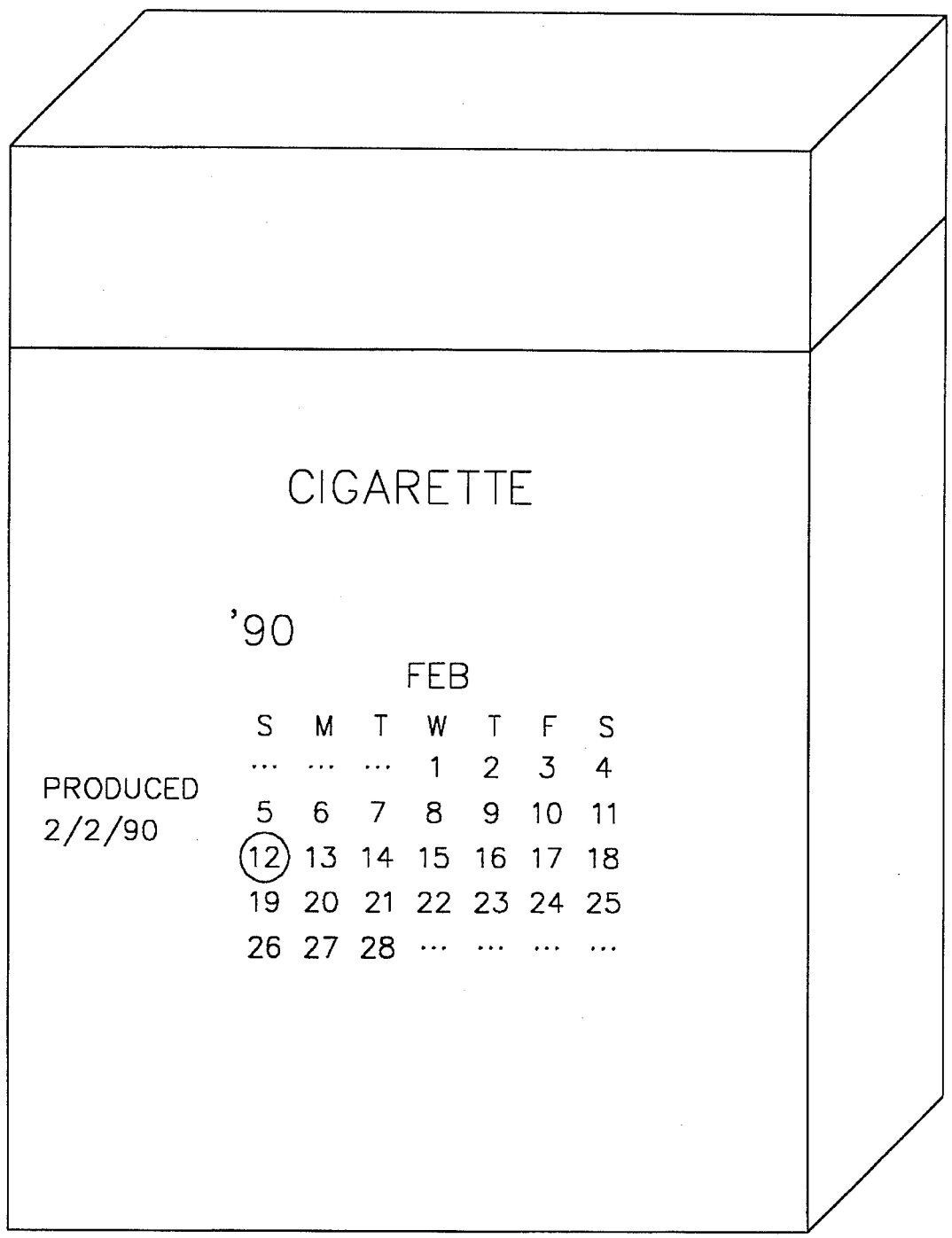
FIG. 18 and 19 are perspective views of cigarette packages in accordance with the invention.

FIG. 18 shows a sealed cigarette box 56 having a calendar function. A cigarette box is ordinarily a paper container having a plurality of cigarettes as its content. As cigarettes are known as harmful to health, smokers should exercise care not to smoke excessively.

A calendar covering one month is printed on a surface of the cigarette box. A smoker can better control his or her smoking, prevent excessive smoking and maintain health by using this calendar. For instance, if a decision is made not to smoke over ten cigarettes in a week, smoking behavior can be better controlled by looking at this calendar. Also after the cigarettes are consumed the empty box may be used to provide calendar information.

Figure 19:
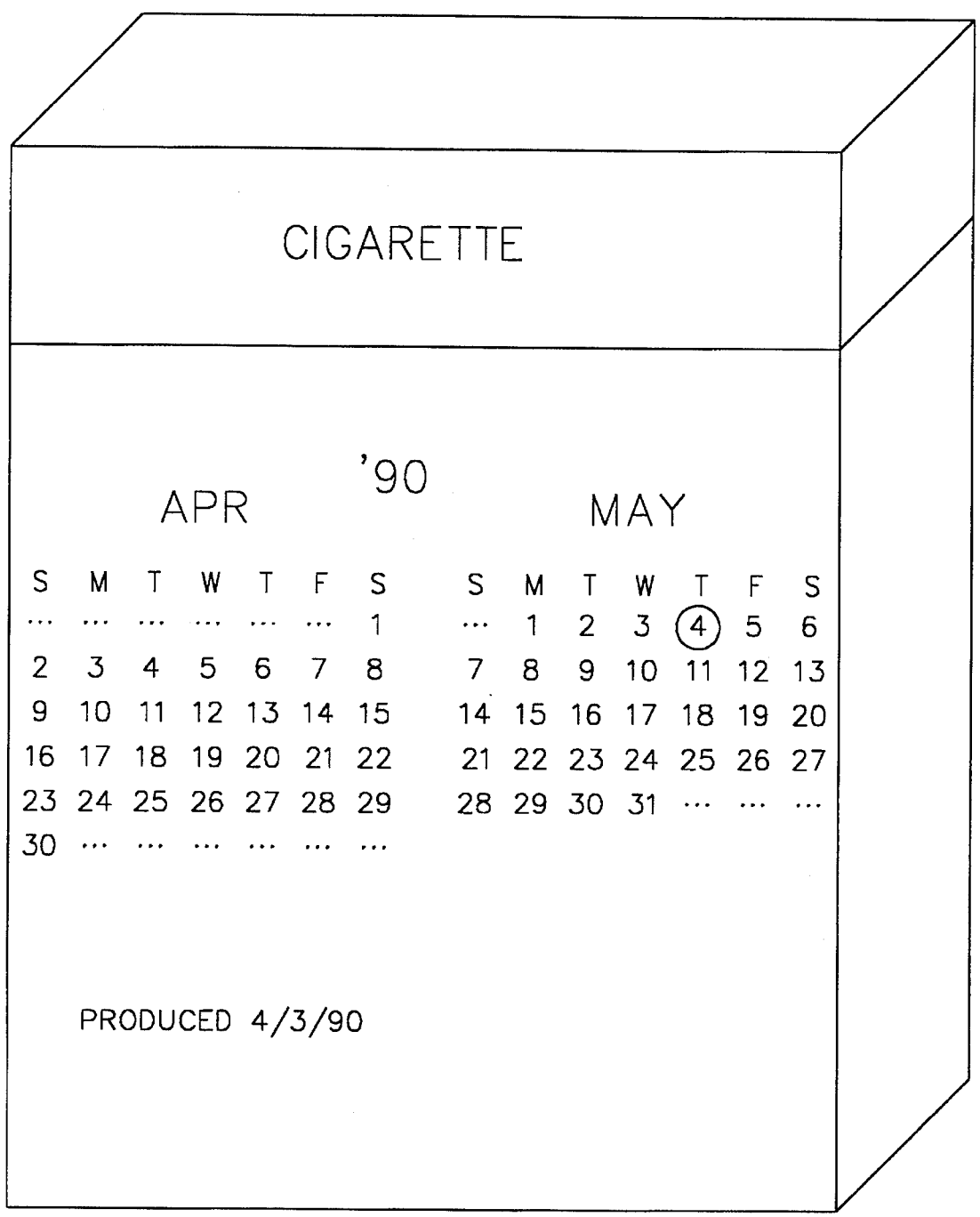
Figure 20:
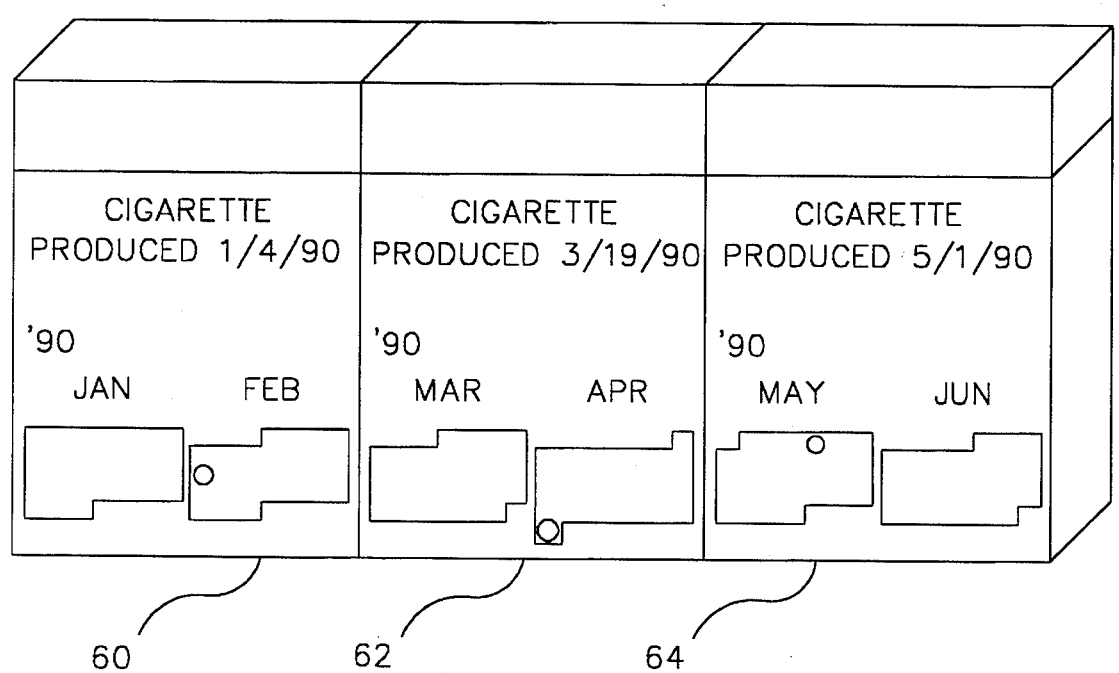
FIG. 20 is a perspective view showing a plurality of cigarette packages having calendar functions, positioned adjacent to each other to provide a multiple-month calendar.

FIG. 19 shows a sealed cigarette box 58 having a calendar for two months inscribed on its exterior surface. Therefore, calendar information for two months can be obtained from one cigarette box, and at the same time the box can be used to control smoking, over a period of two months. Thus its usefulness in enhanced. FIG. 20 shows an example of use of this cigarette box in which a plurality of the boxes 60, 62 and 64 are arranged to form a multiple month calendar.

Figure 21:
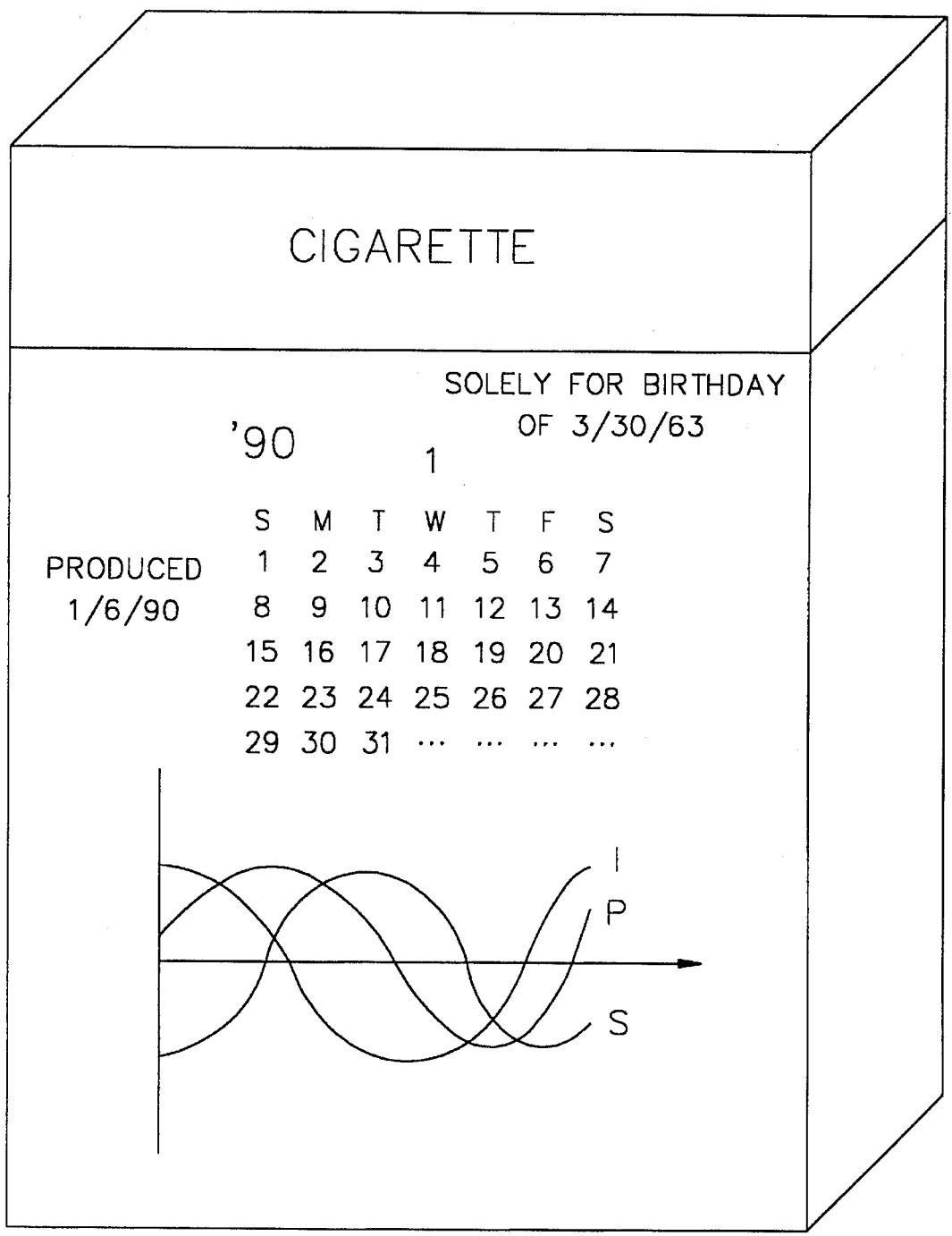
FIGS. 21–24 are perspective views of further cigarette packages in accordance with the invention.

FIG. 21 shows a sealed cigarette box 66 having one of its surfaces a calendar for one month and biorhythm information in the calendar month for a specific birthday, e.g. the 30th of Mar. of 1963, are printed.

When biorhythm information for a specific date is printed on a surface of a cigarette box along with a one month calendar, the user may select a box prepared for his or her birthday, and can better control his or her health by determining a number of cigarettes to be consumed in a day based on the biorhythm information. While calendar and biorhythm information are both printed on the same side in this example, they may be printed separately, one being on a front side of the package and the other being on the opposite side. This way space is provided for a larger amount of information.

Figure 22:
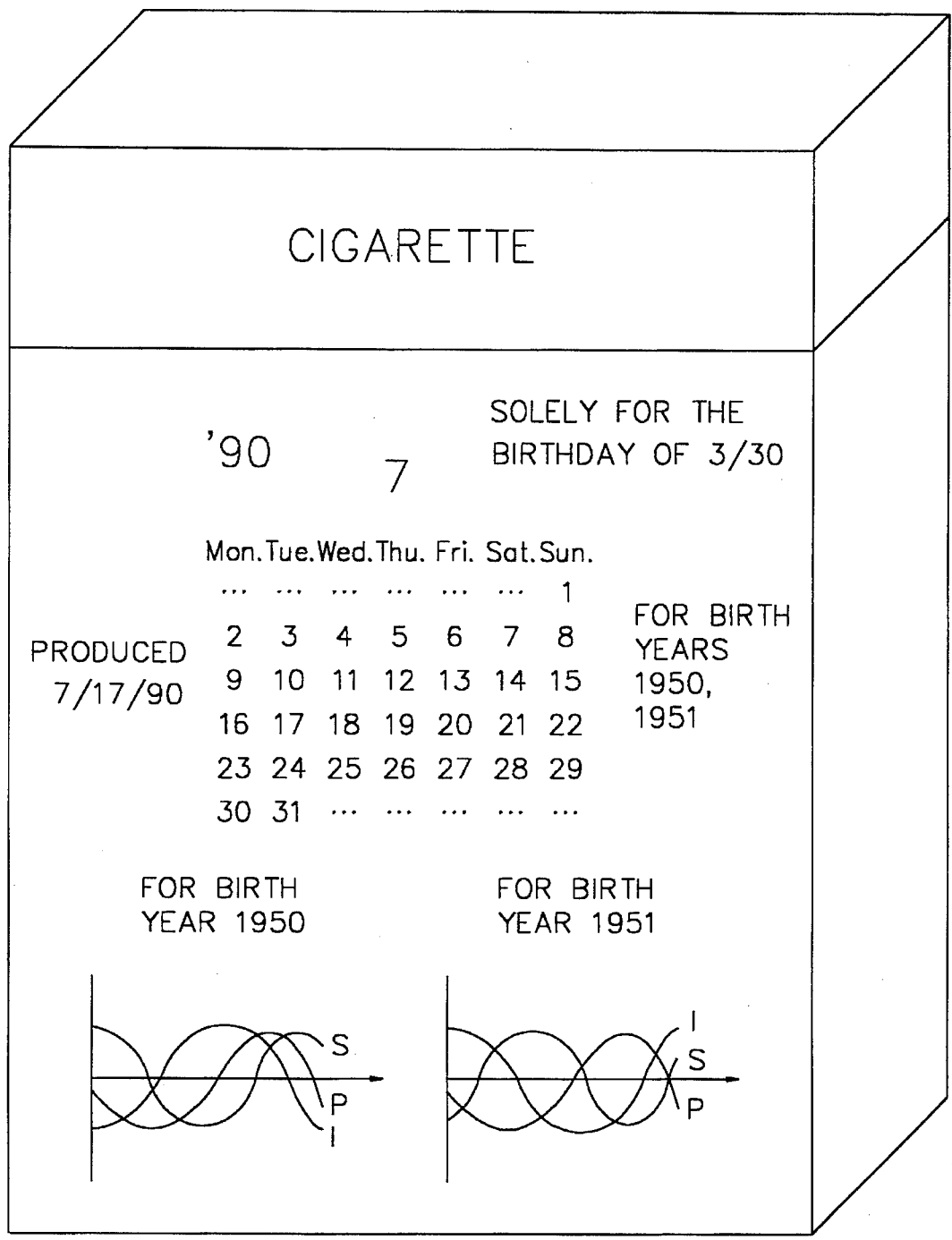

FIG. 22 shows a sealed cigarette box 68 on which biorhythm information for a specific day is printed for each one of plural number of years.

An individual can obtain a cigarette box specifically intended for his/her birthday, and determine biorhythm information corresponding to the year of his/her birth for a particular period corresponding to the calendar printed on the package.

Figure 23:
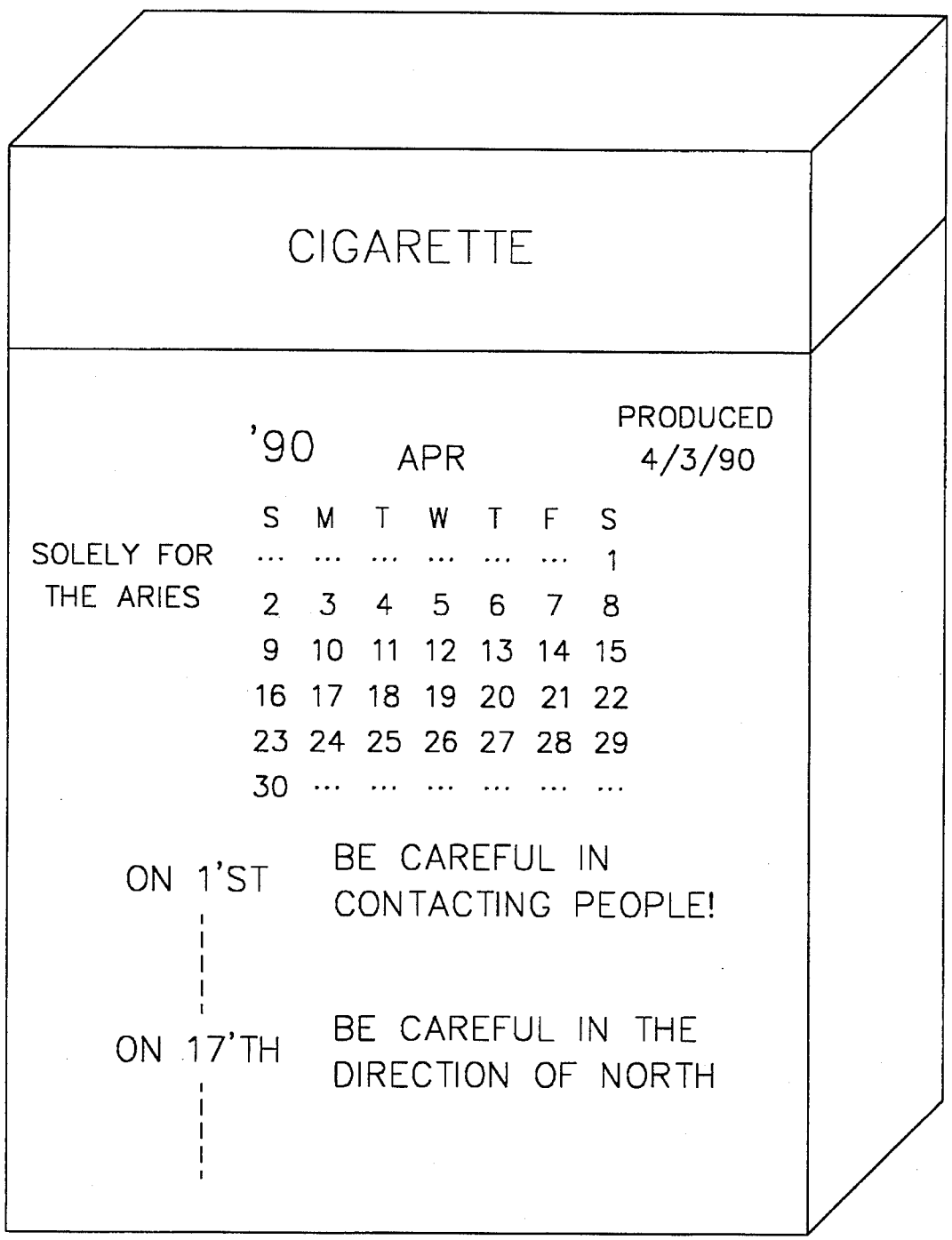

FIG. 23 shows a sealed cigarette box 70 intended solely for a specific constellation, e.g. Aries, in the horoscope. This cigarette box has, along with an ordinary calendar, horoscope information for Aries corresponding to the calendar inscribed.

Each person will be able to control health based on the constellation information by obtaining a cigarette box prepared specifically for his/her constellation.

Figure 24:
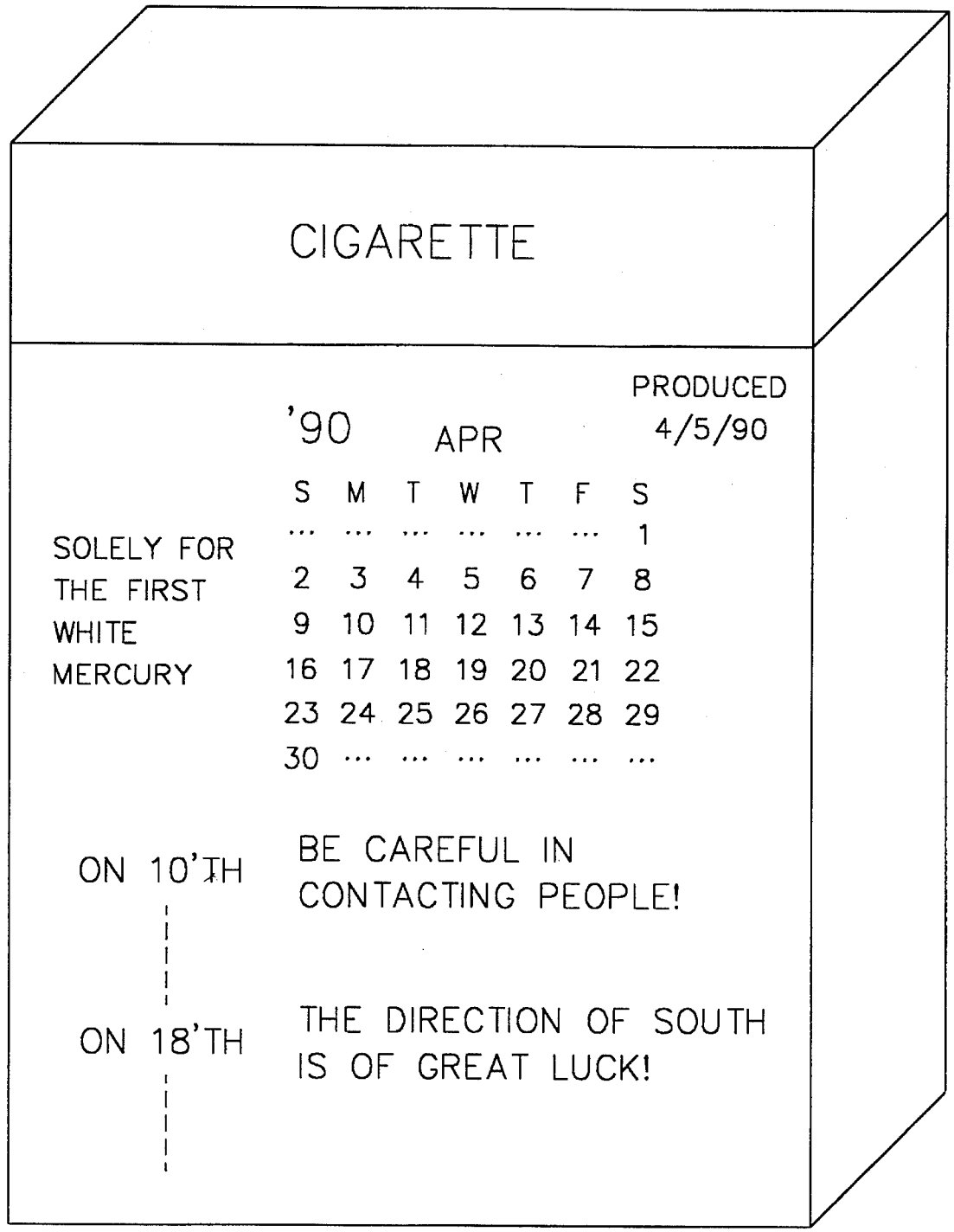

FIG. 24 shows information for a specific star in the Tetrastyle Destiny inscribed in place of the constellation information of FIG. 23.

While the examples of FIGS. 21–24 have information on one month only printed therein, the information could be for two months or more.

Other containers such as paper boxes containing tissue paper, plastic bags containing rice cakes etc., may be printed with information similar to that on the cigarette boxes of FIGS. 18-24.

Figure 25:
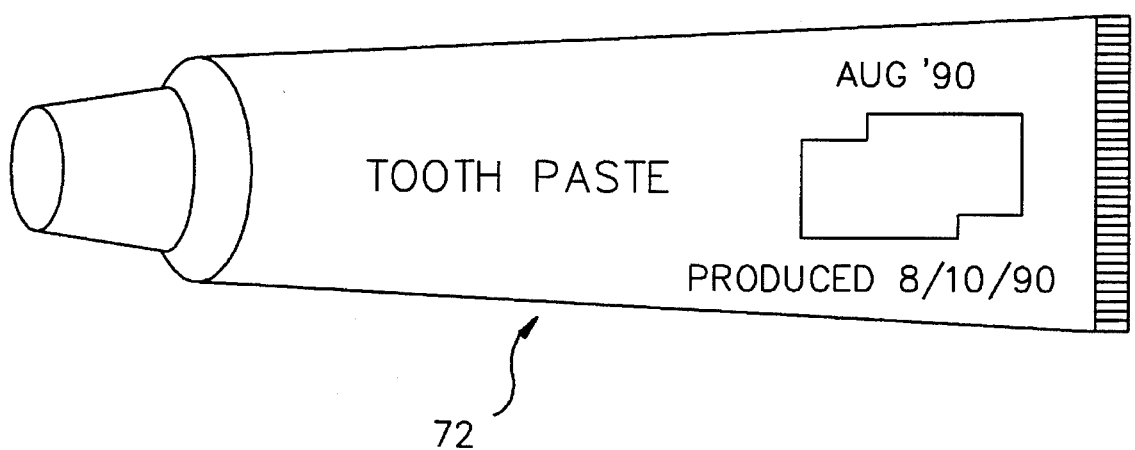
FIGS. 25–30 are perspective views of toothpaste tubes in accordance with further embodiments of the invention.

FIG. 25 shows a sealed tooth paste tube 72 having a calendar function. Ordinarily tooth paste is used at a certain fixed time or times of the day such as before going to bed or in the morning.

A calendar for one month is printed on the tooth paste tube and calendar information can be obtained from the tooth paste tube at a same time that the tube is being used. Because the calendar information is obtained at a certain fixed time of day, it will be quite convenient to and a person in planning his/her daily life.

Figure 26:
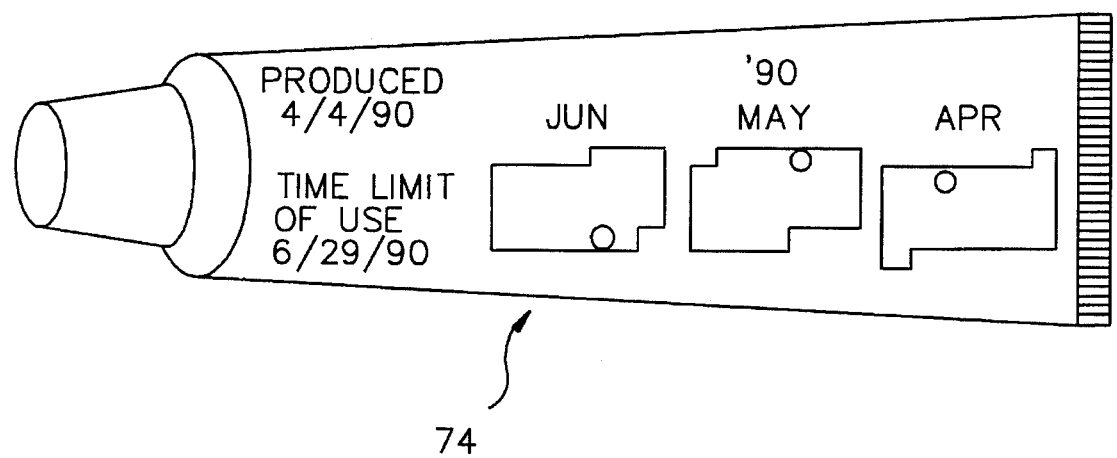

FIG. 26 shows a sealed tooth paste tube having a calendar covering three months.

As the tooth pasted is consumed, the tube is ordinarily wound up from the tail end (the end opposite from the outlet). In view of this practice, the monthly calendars should be so arranged that the earlier month is printed nearer the tail end as shown in FIG. 26.

Figure 27:
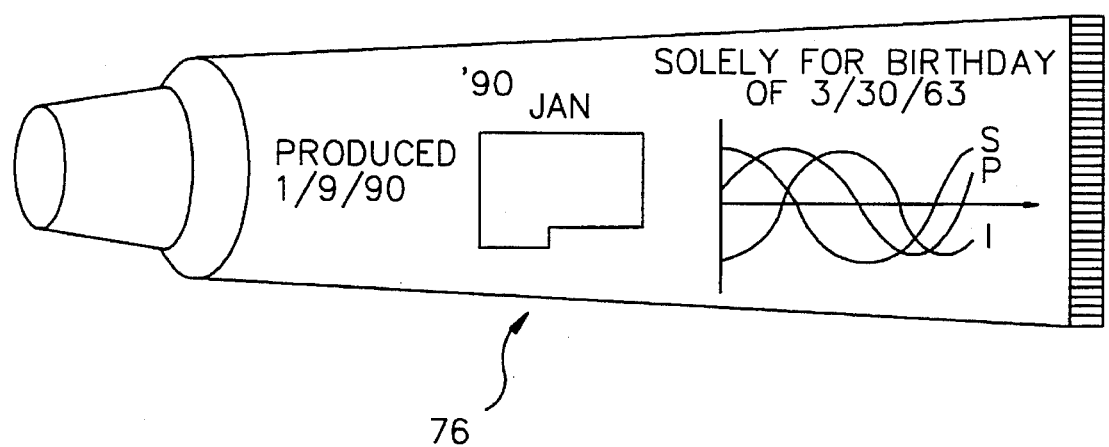

FIG. 27 shows a sealed tooth paste tube 76 having, in addition to an ordinary calendar for one month, biorhythm information for that month, for a specific birth date, e.g. 30th of Mar., 1963.

Each person can use a tooth paste tube with biorhythm information specific to his/her birthday.

Figure 28:
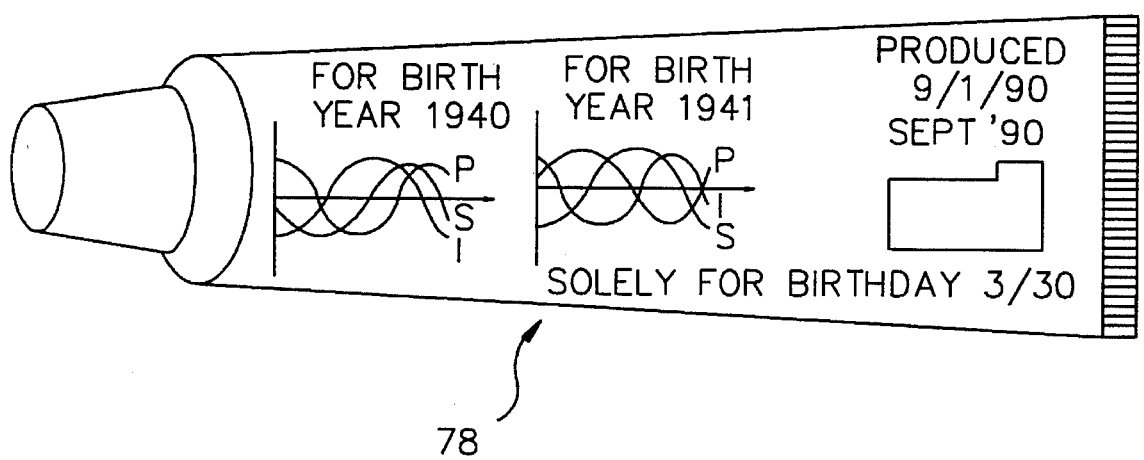

FIG. 28 shows a sealed tooth paste tube 78 having, in addition to an ordinary calendar for one month, a plurality of biorhythms for a specific birthdate, e.g. 30th Mar., one for a first year of birth, e.g. 1940 and one for another year of birth, e.g. 1941. The biorhythm information is provided for the month corresponding to the calendar inscribed on the surface of the tube.

A person can use a tooth paste tube prepared solely for the day and month of his/her birthday and can find out the biorhythm information corresponding to his/her age, thus obtaining biorhythm information along with ordinary calendar information.

Figure 29:
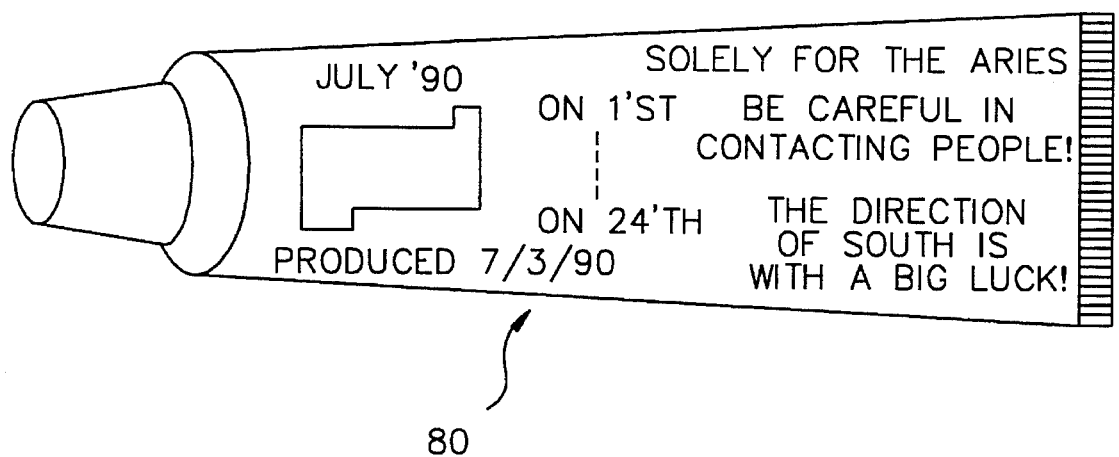

FIG. 29 shows a sealed tooth paste tube 80 having in addition to an ordinary calendar, horoscope information for a particular constellation.

An individual using a tooth paste tube 82 solely for his/her own constellation can obtain his/her horoscope in a regular manner.

Figure 30:
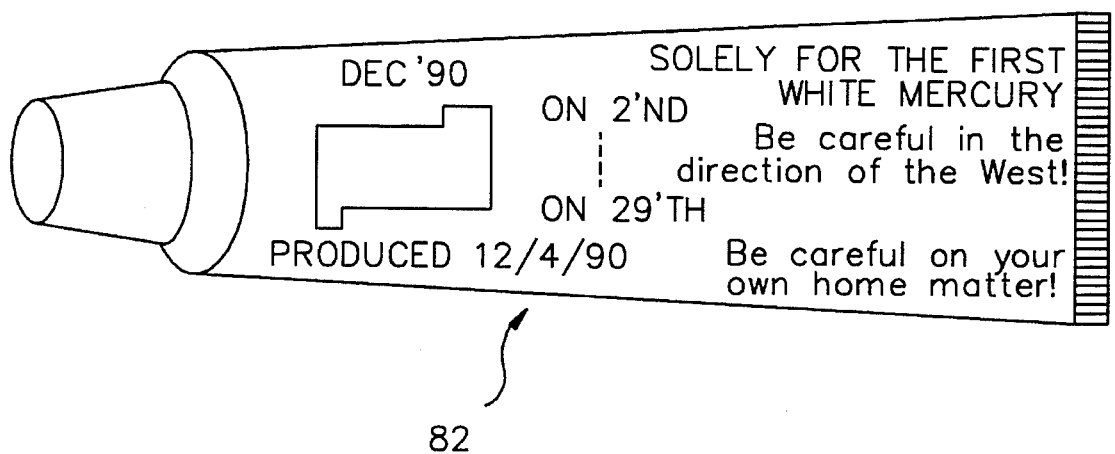

FIG. 30 shows a sealed tooth paste tube 82 having, in addition to an ordinary calendar, information for a particular star, e.g. First White Mercury, in the Tetrastyle Destiny inscribed thereon.

While the biorhythm information and a calendar information are inscribed together on a container intended solely for a specific date or specific period of time, the abscissa in a biorhythm graph may be used as a calendar.

The calendar table and the information on a specific date or a specific period of time may be inscribed with florescent marking material, so that they can be easily distinguished from other printed matter even at night.

In a case of paper packages containing perishable products such as, milk, a calendar covering about 1–2 weeks or one month, which includes the production date in its earlier part will be best suited as a calendar style in view of the perishable nature of the contents and combustible characteristic of the container.

A durable can made of aluminum or other metal, and containing a less easily perishable substance such as liquid or coffee, can be kept for prolonged period of time both before and after consumption. A calendar table for three months to one year is best suited as a type of calendar for such a container. However, when contents are liquid coffee or another substance intended for human consumption, the calendar should include the production date to indicate clearly the quality of the contents. The production date can be inscribed in a different color so that it is distinguished from the other dates on the calendar. Further, the useful life of the product can be indicated. In a case of a tissue paper box, the calendar may cover a long period of time regardless of the production date, as both the contents and the container last for a long period of time.

In the case of a tooth paste tube, a calendar covering one to two months from a presumed initial date of consumption would be best suited since the tooth paste is consumed in one to two months, and the tooth paste tube is easily disposable.

So as far as the position at which the calendar is printed or inscribed is concerned, in a case of a juice can it is desirable to have the calendar printed or inscribed on the side near where the outlet is provided. The outlet will be facing a consumer when the content is drunk so that the calendar is easily visible.

The invention is also applicable to lighters, in which the contents are liquid fuels evaporated into an ignitable gas, ball point pens or fountain pens. Also, the container may be of the kind having electric or magnetic means for releasing the contents.

In any event, any kind of sealed containers, regardless of the content, falls within the scope of the present invention so long as the contents are consumed or used over time.

Figure 8:
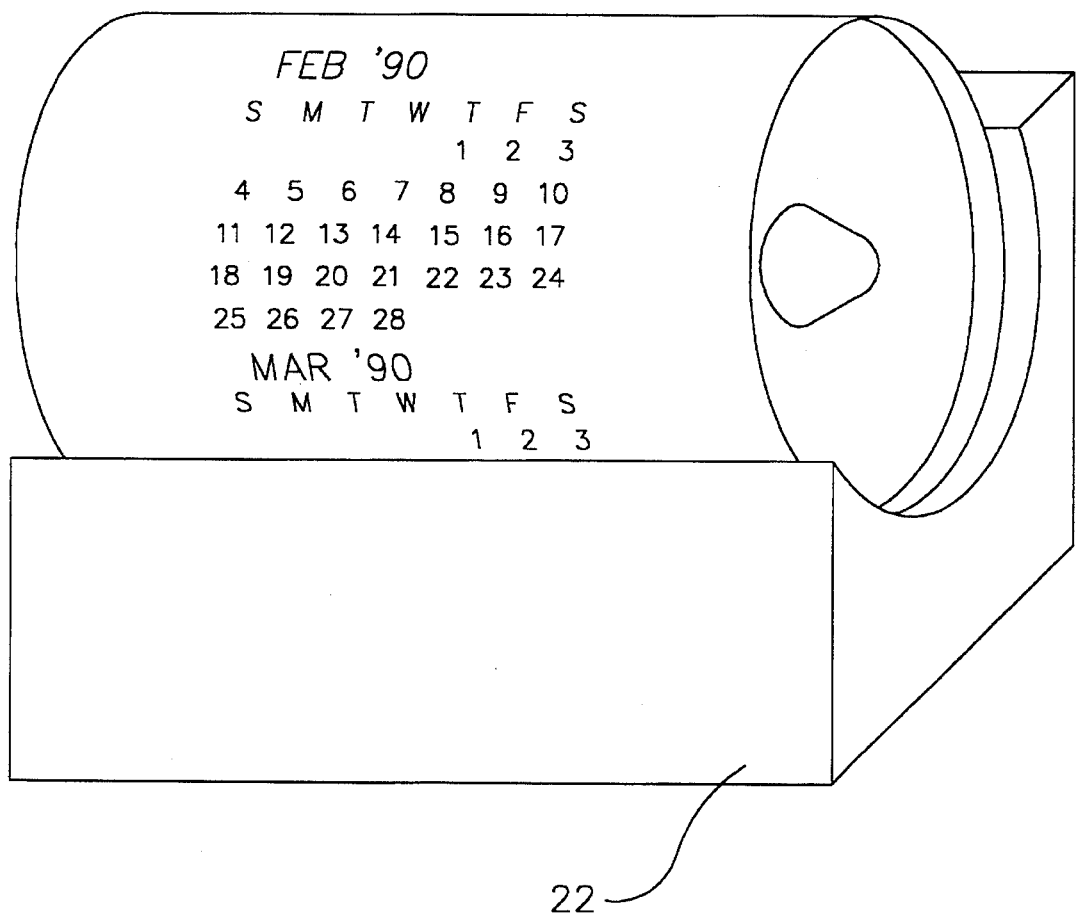
FIGS. 8, 9 and 10 are perspective views showing juice cans of the kind shown in FIG. 6 held in supporting stands.
Figure 9:
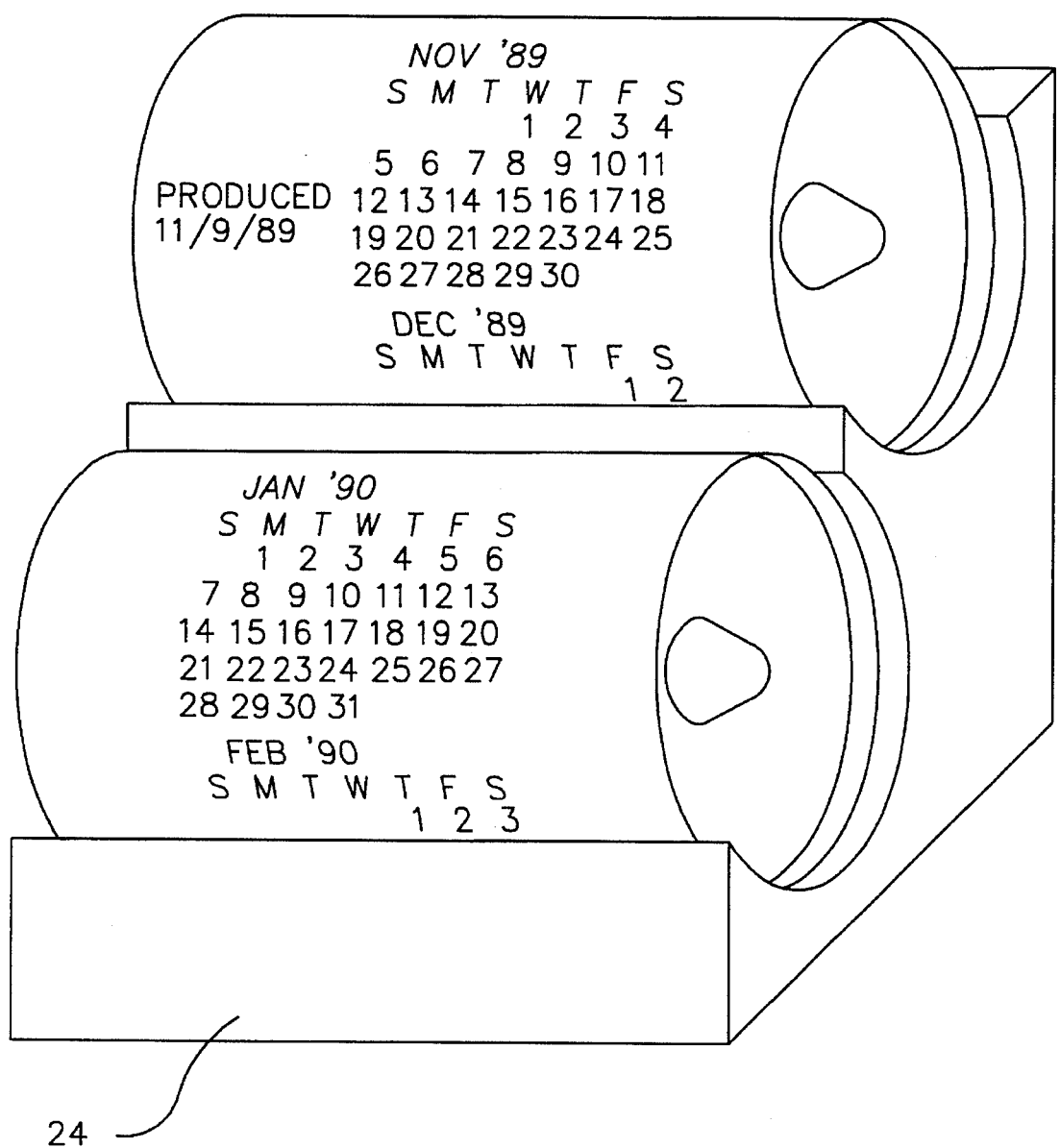
Figure 10:
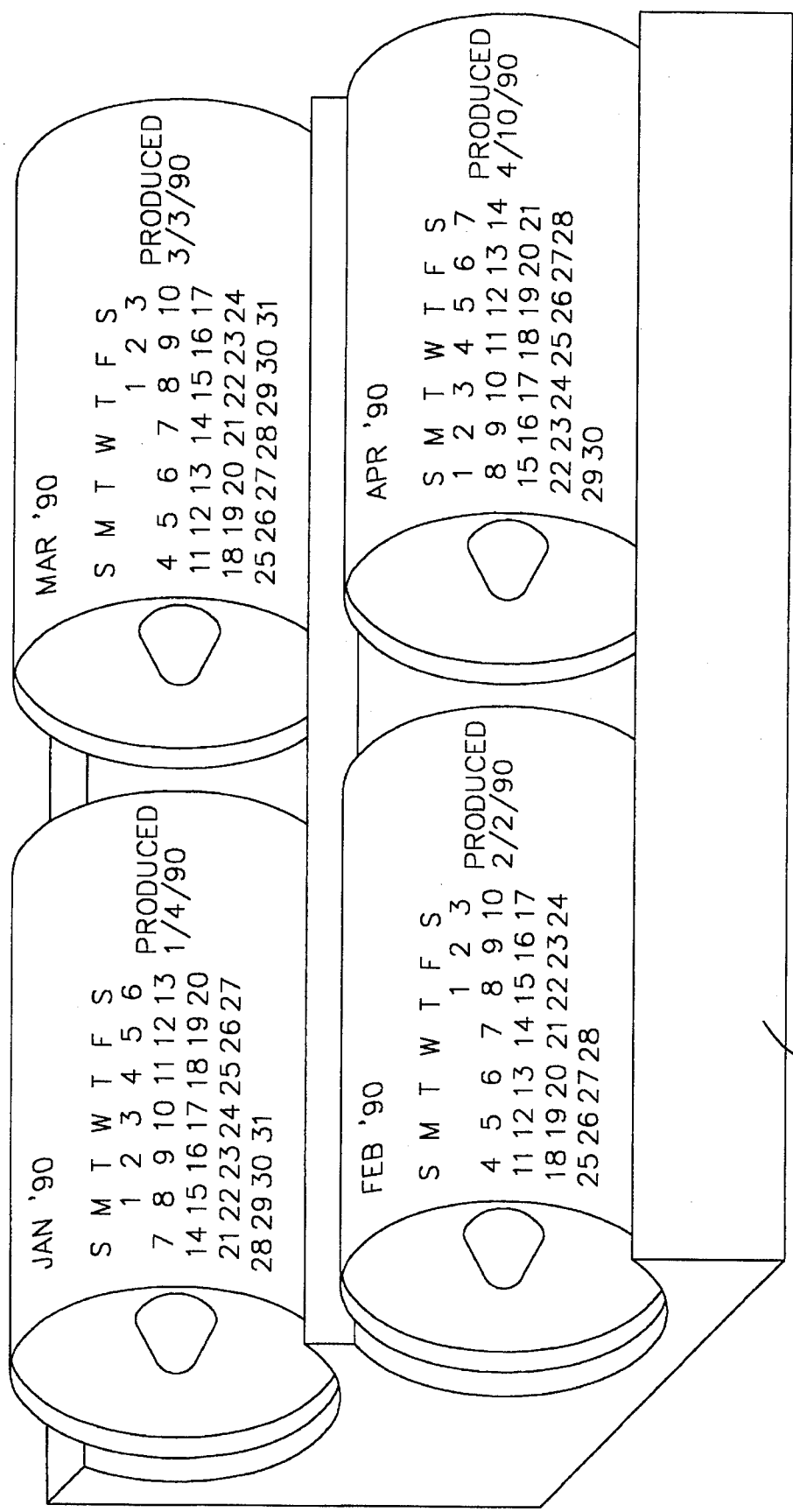

Referring to FIGS. 8, 9, and 10, which show stands on which a juice can is rotatably placed, the stand may be of any type as long as a container can be rotatably placed thereon. Especially, if a container is of the type shown in these drawings, there is little possibility that it will come out of place. This kind of calendar table can be provided on any kind of a cylindrical shape; not only a juice can.

Figure 32:
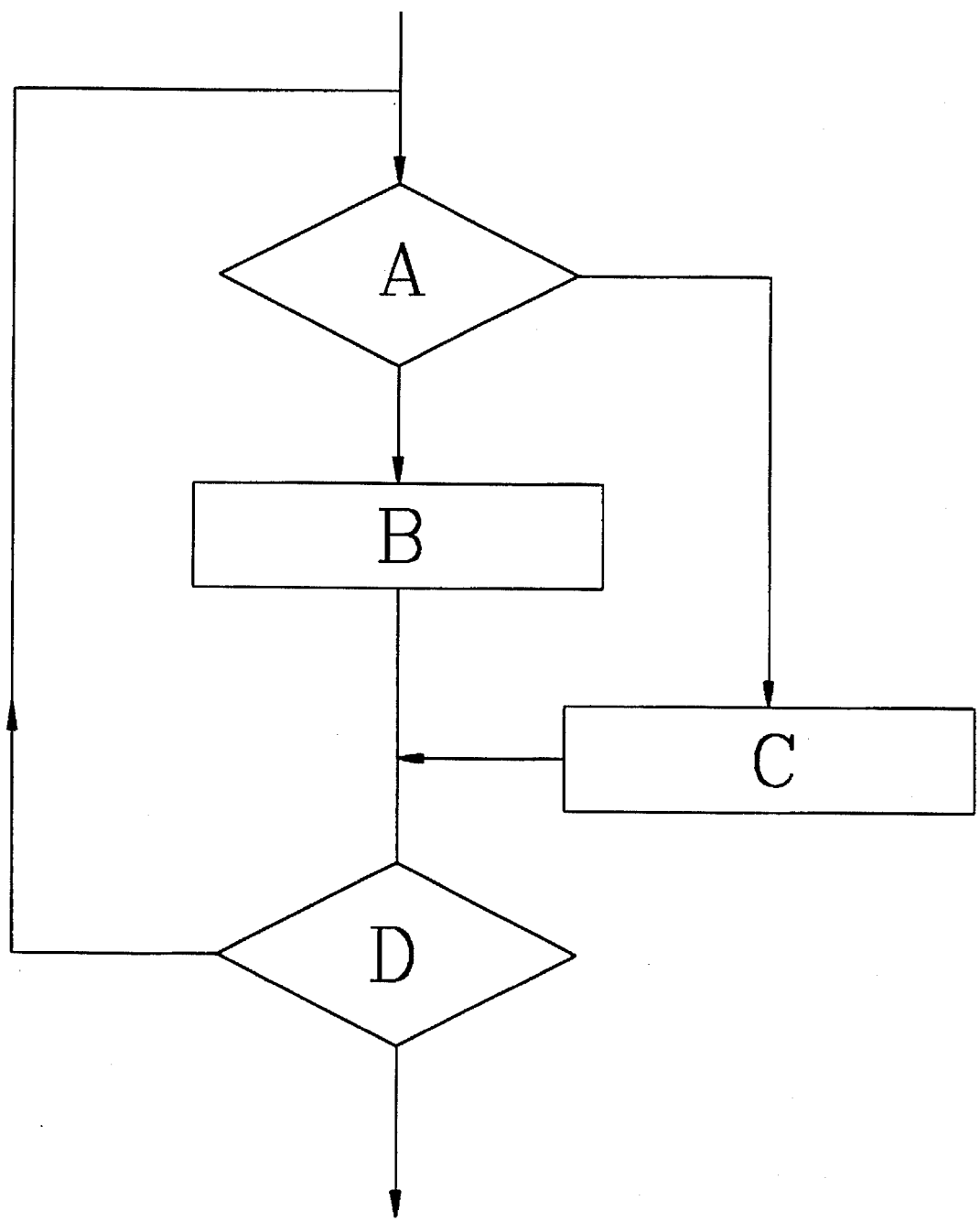
FIG. 32 is a flow diagram illustrating the control of an automatic vending machine in accordance with the invention.

FIG. 32 is a control flow chart for the automatic vending machine shown in FIG. 17. Part A judges whether a signal generated by the designating means pushed by an individual is the one from the content designating means or not. Part C defines a value of the signal. Part B defines a signal for a calendar if the signal is not for the kind of content. Part D confirms that both signals have been defined. When the both signals are defined at part D, a corresponding sealed container having a calendar function will be dispensed. When the both signals are not defined, the initial state is reinstated.

As has been explained, a sealed container with a calendar function has at least a continuing part of a calendar inscribed on its surface. Therefore, the container can be used as a calendar before the content is consumed, and can serve a combined role of a server for consumption and a calendar as the content is consumed. It serves as a calendar after the content is consumed, with its weight having been reduced.

Further, when a container is designed solely for a specific date or a specific period of time it can respond to diverse demands and provide information wanted by the individual instantly.

When a calendar corresponding to a production date and the useful life of the product is inscribed on a sealed container, a consumer can positively and clearly confirm the quality of the contents.

A container according to the invention can serve as a calendar even after its contents are consumed, and will consequently not be thrown away immediately.

Figure 31:
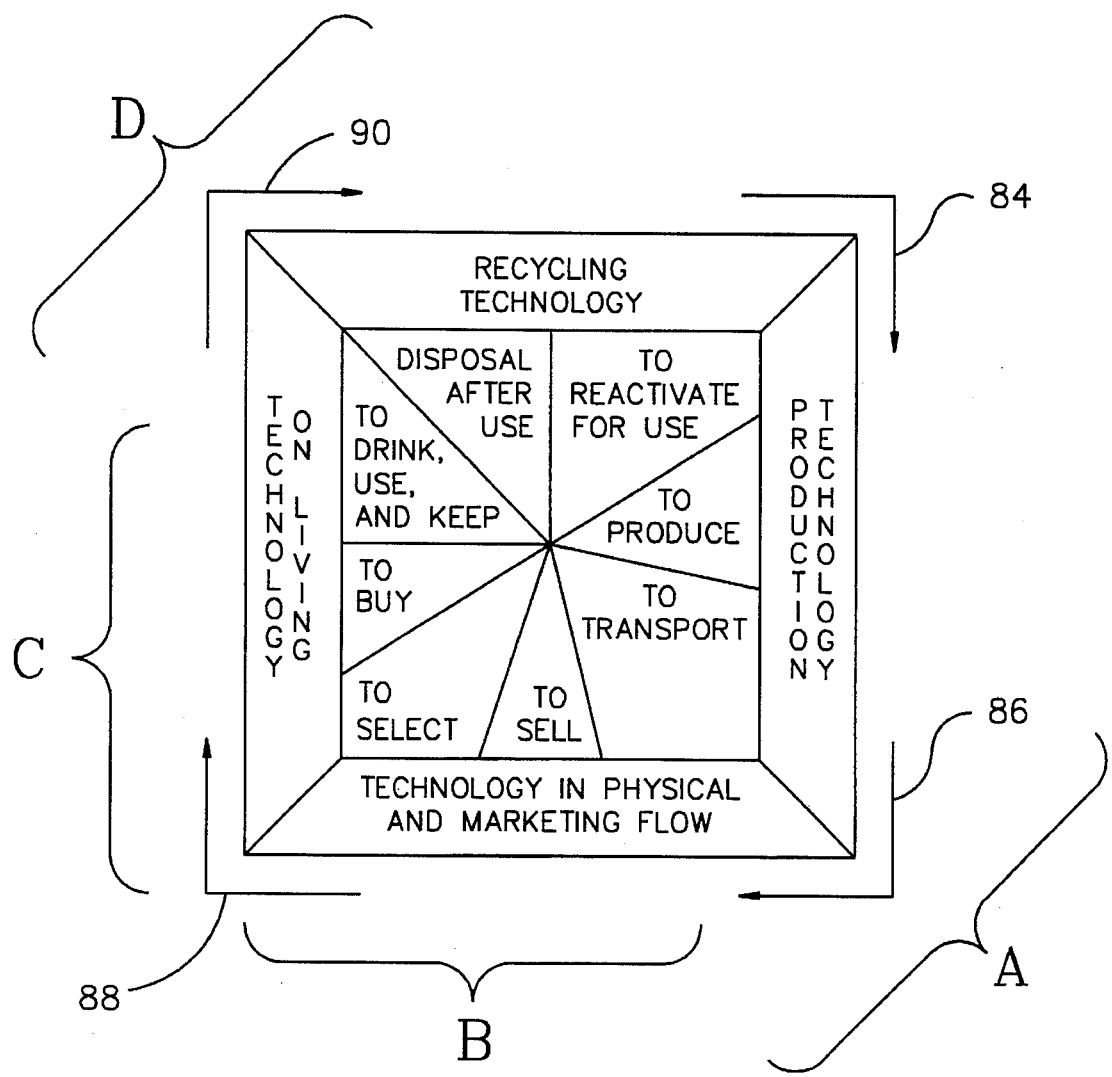
FIG. 31 is a diagram illustrating the effect of the invention.

The circulation of a sealed container for packaging contents for one-time use is shown arrows 84, 86, 88 and 90 in FIG. 31. If a calendar related to the quality of the contents is inscribed on the on container, (A) people responsible for transportation of the container can clearly identify a time for transportation of the container; (B) people responsible for its sale can clearly determine the time of sales of the container; (C) a consumer can clearly confirm the quality of the contents; and (D) the time for disposition after use or for recycling can be postponed.

When an automatic vending machine is described herein is used, as sealed container with a desired calendar function can be automatically obtained by suitably combining a calendar type designating means and a means for designating a specific date or a specific period of time.

What is claimed:

1. A sealed container having a seal which is incapable of being reused when broken, and a consumable product sealed therein, all of the consumable product in the sealed container having a single predetermined production date on which the product was made, and a single predetermined expiration date after which the properties of the consumable product will have changed to an extent such that the product is no longer suitable for consumption, in which a continuous portion of a calendar is printed on an exterior surface of said container along with the year or years of said continuous portion of a calendar, and in which said continuous portion of a calendar overlaps the time interval between said predetermined dates, said continuous portion of a calendar includes at least one of said predetermined dates and said at least one of said predetermined dates is indicated on the exterior surface of the container.

2. A sealed container according to claim 1 in which said at least one of said predetermined dates is marked on said continuous portion of a calendar to distinguish it from other dates on said continuous portion of a calendar.

3. A sealed container according to claim 2 in which said exterior surface of the container also has printed on it information specifically related to a particular span of time within said continuous portion of the calendar.

4. A sealed container according to claim 1 in which said exterior surface of the container also has printed on it information specifically related to a particular span of time within said continuous portion of the calendar.

5. A sealed container having a seal which is incapable of being reused when broken, and a consumable product sealed therein, the consumable product having a predetermined production date and a predetermined expiration date, in which a continuous portion of a calendar is printed on an exterior surface of the container and in which said continuous portion of a calendar includes both said predetermined dates and both of said predetermined dates are indicated on the exterior surface of the container along with the year or years of said continuous portion of a calendar.

6. A sealed container according to claim 5 in which both of said predetermined dates are marked on said continuous portion of a calendar to distinguish them from other dates on said continuous portion of a calendar.

7. A sealed container according to claim 6 in which said exterior surface of the container also has printed on it information specifically related to a particular span of time within said continuous portion of the calendar.

8. A sealed container according to claim 5 in which said exterior surface of the container also has printed on it information specifically related to a particular span of time within said continuous portion of the calendar.

9. A sealed container having a consumable product sealed therein, the consumable product having a predetermined expiration date after which the properties of the consumable product will have changed to an extent such that the product is no longer suitable for consumption, in which a continuous portion of a calendar is printed on an exterior surface of the container, said continuous portion of the calendar including said expiration date and at least a portion of said useful life immediately preceding said expiration date, and in which said expiration date and said portion of said predetermined useful life, as they appear on said continuous portion of a calendar, are distinguished from dates in said continuous portion of the calendar outside said useful life.

10. A sealed container according to claim 9 in which said exterior surface of the container also has printed on it information specifically related to a particular span of time within said continuous portion of the calendar.

* * * * *